United States Patent
Hamaguchi

(10) Patent No.: US 8,244,923 B2
(45) Date of Patent: Aug. 14, 2012

(54) APPLICATION SETTING MANAGEMENT APPARATUS, AND METHOD AND PROGRAM FOR CONTROLLING SETTING MANAGEMENT APPARATUS

(75) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 12/683,588

(22) Filed: Jan. 7, 2010

(65) Prior Publication Data
US 2010/0185783 A1 Jul. 22, 2010

(30) Foreign Application Priority Data
Jan. 16, 2009 (JP) .................................. 2009-007670

(51) Int. Cl.
G06F 13/10 (2006.01)
G06F 15/177 (2006.01)
(52) U.S. Cl. ................................. 710/8; 710/16; 710/19
(58) Field of Classification Search .......................... None
See application file for complete search history.

(56) References Cited

U.S. PATENT DOCUMENTS
2007/0027972 A1* 2/2007 Agrawal et al. ............... 709/223
2007/0282995 A1* 12/2007 Mizuno et al. ................ 709/223
2009/0228868 A1* 9/2009 Drukman et al. ............. 717/121
* cited by examiner Primary Examiner — Ilwoo Park
(74) Attorney, Agent, or Firm — Fitzpatrick, Cella, Harper & Scinto

(57) ABSTRACT

An application setting management apparatus provided therein is capable of managing settings that differ in accordance with the device groups even when a plurality of device groups differing in function and option from each other are included. The management apparatus is connected to a plurality of devices through a communication line, and includes a reception unit configured to receive information in regard to setting for a certain application from each of the plurality of devices through the communication line, a group processing component configured to group the plurality of devices on the basis of the received information in regard to the setting for the certain application, and a transmission unit configured to transmit information used for configuring the common setting in relation to the certain application through the communication line to a plurality of grouped devices.

6 Claims, 19 Drawing Sheets

401
< COMMON SPECIFICATION SETTINGS >
PRIORITY OF FUNCTION SCREEN
AND STATUS SCREEN
INITIAL SCREEN OF FUNCTION FEATURE
INITIAL SCREEN OF STATUS SCREEN
INITIAL SCREEN AFTER AUTOMATIC CLEAR
BUZZER SETTING
INCH INPUT ON/OFF
CASSETTE AUTOMATIC SELECTION
ON/OFF
REGISTRATION OF TYPE OF PAPER
CHANGE IN POWER-SAVING MODE
SETTING OF DEDICATED TRAY
PRINT PRIORITY ORDER
NORMAL MODE OF LOCAL PRINT
SETTING OF DISPLAY LANGUAGE
SHIFT BETWEEN JOBS
PRIORITY OF MONOCHROME TEXT/
PHOTO OF BLACK & WHITE IN
AUTOMATIC COLOR SELECTION
PRIORITY OF PRINT QUALITY/SPEED

402
< COPY AND SCAN
   SPECIFICATION SETTINGS >
AUTOMATIC SORTING
IMAGE ORIENTATION PRIORITY ON/OFF
COPY-OPERATION
WAITING-TIME DISPLAY ON/OFF
AUTOMATIC VERTICAL/
HORIZONTAL ROTATION
DEFAULT SCAN SETTING SELECTION
(=STANDARD MODE SETTING)
FILE FORMAT
READ DENSITY

403
< NETWORK SETTINGS >
IP ADDRESS SETTING
SUBNET MASK SETTING
GATEWAY ADDRESS
DHCP USE/NON-USE)
RARP USE/NON-USE
BOOTP USE/NON-USE
DNS SERVER OR IP ADDRESS
HOST NAME
DOMAIN NAME
WINS RESOLUTION
WINS SERVER SETTING
REGISTRATION TO DNS SERVER
DNS SERVER SETTING

404
< COST-SAVING SPECIFICATION SETTINGS >
POWER CONSUMPTION IN SLEEP STATE
SETTING OF POWER-SAVING MODE
SETTING OF FORCED DOUBLE-SIDE MODE
SETTING OF FORCED LAYOUT MODE
SETTING OF FORCED TONER-SAVING MODE

405
< RECEPTION/TRANSMISSION
 SPECIFICATION SETTINGS >
TRANSMISSION START (FORWARD) SPEED
RECEPTION START (FORWARD) SPEED
RECEPTION PASSWORD
RECEPTION DEFAULT ACTION
(MEMORY RECEPTION)
DATA SIZE IN SPLIT MAIL TRANSMISSION
SUBJECT NAME ASSIGNED WHEN SUBJECT
IS OMIITED
FULLMODE TRANSMISSION TIME-OUT TIME
PRINT WHEN MDS/DSN RECEPTION
USE OF WAY OF SERVER
USE OF REMOTE UI
LIMIT OF FAX CONTROL CARD USER
PRESENCE/ABSENCE OF TRANSFER
SECRET NUMBE
NUMBER OF ABBREVIATED
DESTINATION DIALING
DESTINATION ABBREVIATION
LIMIT OF TRANSFER INSTRUCTION SOURCE
PRINTING OF RECEIVED ORIGINAL
FIS SWITCH
ECM RECEPTION
RECEPTION INFORMATION RECORD
ALTERNATIVE RECEPTION
TRANSMISSION SOURCE RECORD (G4)
INCOMING CALL
NUMBER OF RINGING
AUTOMATIC RECEPTION SWITCHING
NUMBER OF SECONDS OF RINGING
SCREEN PRINTING

406
< REPORT SPECIFICATION >
RESULT REPORT OF UNIVERSAL SEND
RESULT REPORT OF G3 FAX TRANSMISSION
RESULT REPORT OF RECEPTION
REPORT OF MEMORY BOX RECEPTION
REPORT OF 100 HISTORIE
REPORT OF ALL HISTORIES DURING
DESIGNATED TIME
DESIGNATION OF TIME

407
< SYSTEM SETTINGS >
REGISTRATION AND DELETION OF
SYSTEM MANAGER ID/ SECRET NUMBER
REGISTRATION OF NAME OF
SYSTEM MANAGER
MAIL ADDRESS OF SYSTEM MANAGER
CONTACT INFORMATION OF
SYSTEM MANAGER
COMMENT OF SYSTEM MANAGER
REGISTRATION OF DEVICE NAME
REGISTRATION OF DEVICE LOCATION
SETTING OF INTERFACE

FIG.4

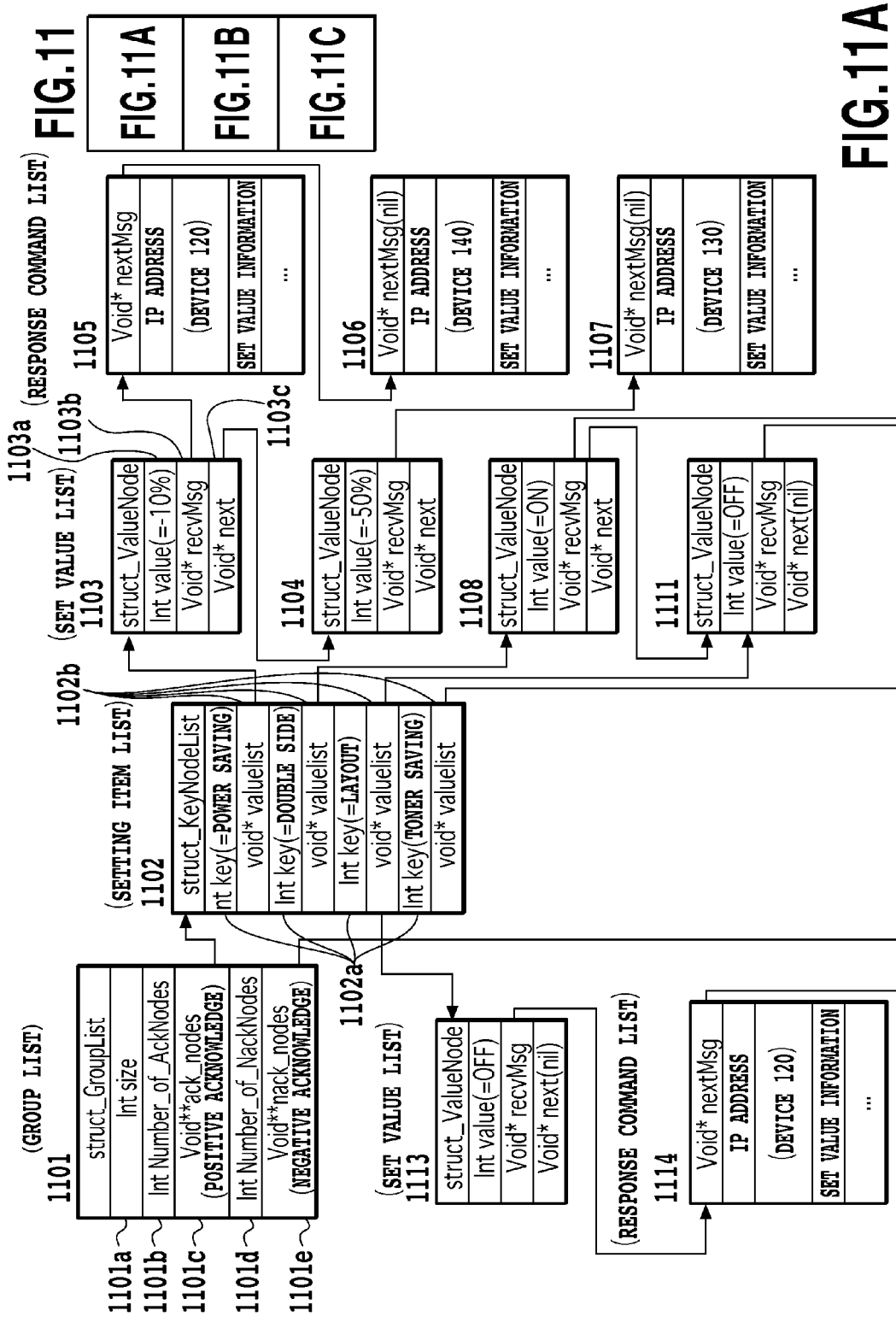

APPLICATION SETTING MANAGEMENT APPARATUS, AND METHOD AND PROGRAM FOR CONTROLLING SETTING MANAGEMENT APPARATUS

BACKGROUND OF THE INVENTION

1. Field of the Invention

This invention relates to an application setting management apparatus for managing application settings in a plurality of devices, and a method and program for controlling the setting management apparatus.

2. Description of the Related Art

Conventionally, a management apparatus is known for individually configuring a variety of application settings in devices connected thereto through a network. A management computer serving as such a type of management apparatus can set application defaults (for example, double-sided copy) for one copier connected thereto through a network.

On the other hand, another management apparatus is also known for collectively configuring a variety of settings in all the devices connected thereto through a network. A management computer serving as such a type of management apparatus can collectively set application defaults (for example, double-sided copy) for all the copiers connected thereto through a network.

However, the former has only the ability to individually manage the application setting on a device-by-device basis. It is impossible to collectively manage the setting in a plurality of devices.

The latter has the ability to collectively manage the application settings in a plurality of devices. However, when there are a plurality of device groups differing in function and option from each other, it is impossible to manage settings that differ in accordance with the device groups.

SUMMARY OF THE INVENTION

The present invention comprises the following configuration to solve the foregoing problems.

A setting management apparatus according to the present invention is an application setting management apparatus connected to a plurality of devices through a communication line, which comprises a reception unit configured to receive information in regard to a setting for an application from each of the plurality of devices through the communication line, a group processing component configured to group the plurality of devices on the basis of the received information in regard to the setting for the application, and a transmission unit configured to transmit information used for configuring the setting for the application through the communication line to the devices grouped by the group processing component.

In the management apparatus according to the present invention, it is possible to collectively configure settings for an application common to grouped devices among a plurality of devices connected through a network. It is also possible to change the set contents on a group-by-group basis.

Further features of the present invention will become apparent from the following description of exemplary embodiments (with reference to the attached drawings).

BRIEF DESCRIPTION OF THE DRAWINGS

FIG. 4 is an example of a list of setting items of an application employed in the image processing device which is the subject of the setting management in the first embodiment;

FIG. 11 is a diagram showing the relationship among FIG. 11A, FIG. 11B and FIG. 11C;

FIG. 11A is a diagram illustrating the group list structure.

DESCRIPTION OF THE EMBODIMENTS

Exemplary embodiments of the present invention will be described below with reference to the accompanying drawings.

First Embodiment

Figure 1:
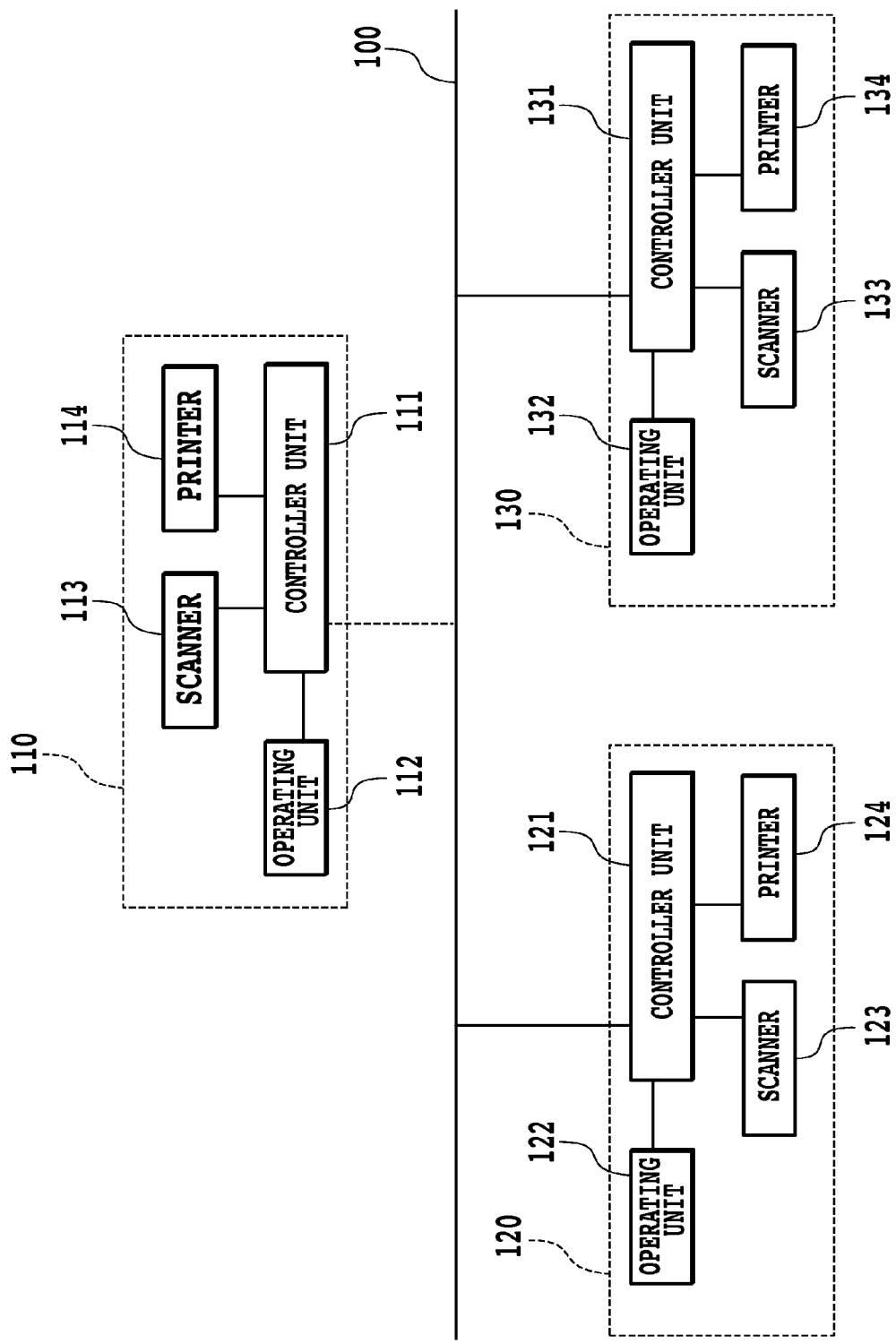
FIG. 1 is a block diagram illustrating the entire configuration of an application setting management system according to a first embodiment.

FIG. 1 is a block diagram illustrating the entire configuration of an application setting management system according to a first embodiment of the present invention.

Description of the Entire System

The application setting management system comprises a plurality of image processing devices 110, 120, and 130 and a LAN 100 which is a network (communication line) providing an interconnection therebetween.

The image processing device 110 is an MFP (Multi Function Peripheral) performing the input/output of an image, transmission/reception of an image and various types of image processing. The image processing device 110 has a scanner 113 which is an image input device, a printer 114 which is an image output device, a control unit 111, and an operating unit 112 serving as a user interface having the ability to receive a user command. The scanner 113, the printer 114 and the operating unit 112 are each connected to the control unit 111 and controlled by instructions from the control unit 111.

The image processing devices 120 and 130 have the same internal configuration as that of the image processing device 110. Specifically, the image processing device 120 is equipped with a scanner 123, a printer 124, an operating unit 122 and a control unit 121 controlling them. Likewise, the image processing device 130 is equipped with a scanner 133, a printer 134, an operating unit 132 and a control unit 131 controlling them.

Description of Software Configuration of Image Processing Device

Figure 2:
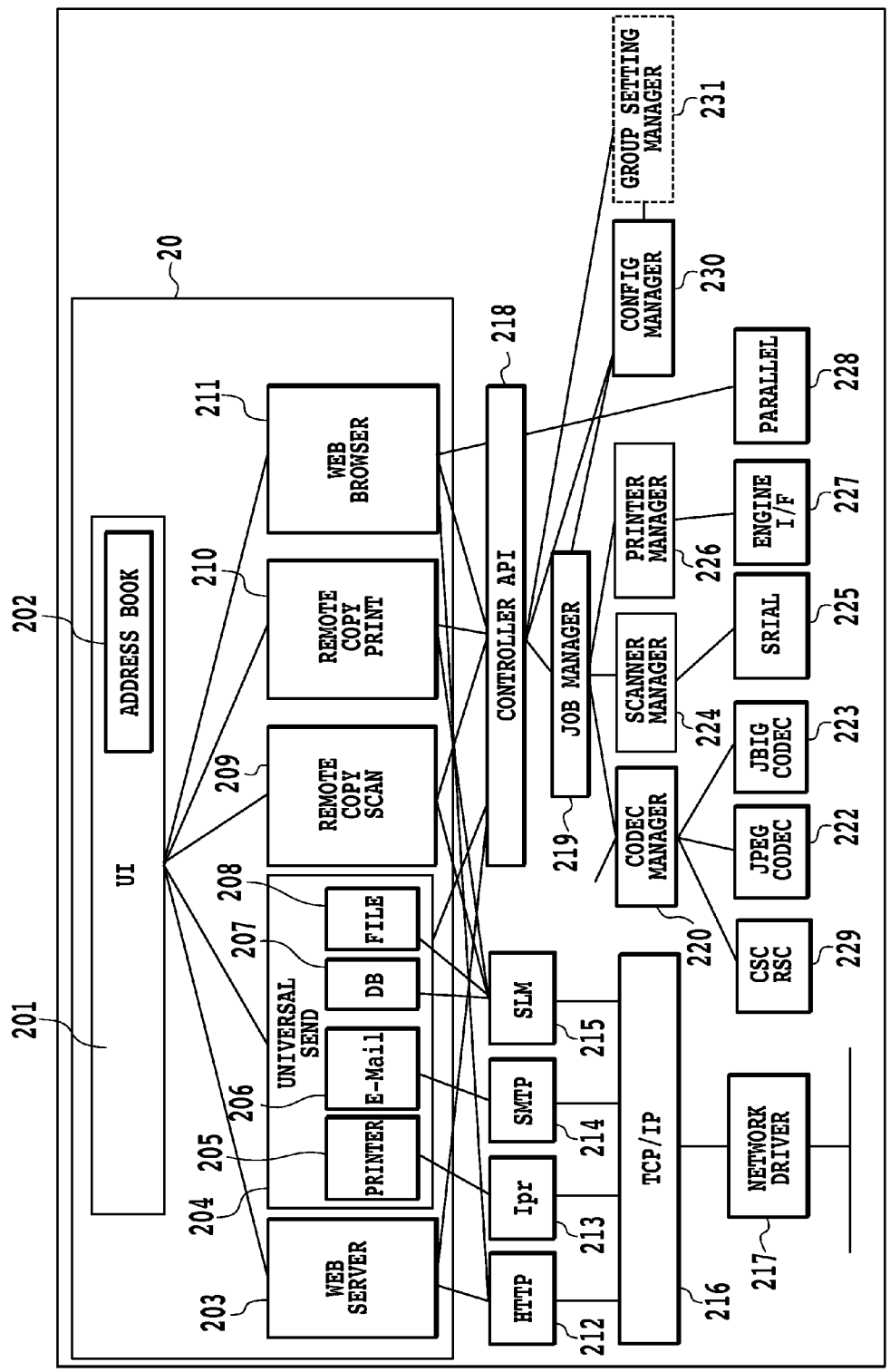
FIG. 2 is a block diagram illustrating the outline of the software configuration of an image processing device in the first embodiment.

FIG. 2 is a block diagram illustrating the outline of the software configuration of the image processing device according to the first embodiment. The image processing device 110 will be described below as an example, but the same can be essentially said of the other image processing devices 120 and 130.

In FIG. 2, reference numeral 201 denotes a user interface module (hereinafter referred to as "UI module"). The UI module 201 is an interface module used when the user variously operates the image processing device 110 or configures settings. The UI module 201 transfers the user-entered information to a variety of modules described later and makes requests for various types of processing. The requested processing includes those for retrieving data setting conditions, changing the data setting, and clearing the present data to the factory installed data, and the like.

Reference numeral 202 denotes an address book module. The address book module 202 is a database module for managing data delivery destinations, communication destinations and the like. Regarding the data managed by the address book module 202, the user can operate for addition, deletion or retrieval of the data through the UI module 201. The address book module 202 gives each of the modules, as described later, information on data delivery destinations and communication destinations through the user operation.

Reference numeral 203 denotes a web server module. The web server module 203 notifies a web client of management information of the image processing device 110 in response to the request from a web client (for example, a host computer) (not shown). The management information is retrieved through a universal send module 204, a remote copy scan module 209, a remote copy print module 210, and a controller API module 218. Then, the management information is conveyed to the web client through a HTTP module 212, a TCP/IP communication module 216 and a network driver 217.

Reference numeral 211 denotes a web browser module. The web browser module 211 reads and displays information from various web sites (home pages) on the Internet or an intranet.

Reference numeral 204 denotes the universal send module for managing data delivery. The universal send module 204 distributes user-specified data through the UI module 201 to a user-specified communication (output) destination. Upon reception of a user command to use a scanner function of the image processing device 110 to generate data to be distributed, the universal send module 204 generates data through the controller API module 218. The universal send module 204 includes a printer module 205, an E-mail module 206, a DB module 207 and a file module 208.

The printer module 205 is activated when the printer is designated as an output destination. The E-mail module 206 is activated when an E-mail address is designated as a communication destination. The DB module 207 is activated when a database is designated as an output destination. The file module 208 is activated when another image processing device similar to the image processing device 110 is designated as an output destination.

Reference numeral 209 denotes the remote copy scan module. The remote copy scan module 209 uses the scanner function of the image processing device 110 to read image information and then outputs the read image information to another image processing device connected through a network or the like. In this manner, the scanner function implemented in the image processing device 110 alone can be performed by use of another image processing device (for example, 120 and 130).

Reference numeral 210 denotes the remote copy print module. The remote copy print module 210 uses the printer function of the image processing device 110 to output image information obtained from another image processing device (e.g., 120 and 130) connected through a network. In this manner, the copy function implemented in the image processing device 110 alone can be performed by use of another image processing device (for example, 120 and 130).

Reference numeral 212 denotes the HTTP module. The HTTP module 212 is used when the image processing device 110 makes HTTP communication. The HTTP module 212 uses a TCP/IP communication module 216, as described later, to provide a communication function to the web server module 203 or the web browser module 211. The HTTP module 212 supports a variety of protocols used on the Web including HTTP, and particularly provides a function for communications based on security protocols.

Reference numeral 213 denotes a Ipr module. The Ipr module 213 uses the TCP/IP communication module 216, as described later, to provide a communication function to the printer module 205 in the universal send module 204.

Reference numeral 214 is a SMTP module. The SMTP module 214 uses the TCP/IP communication module 216, as described later, to provide a communication function to the E-mail module 206 in the universal send module 204.

Reference numeral 215 is a SLM (Salutation-Manager) module. The SLM module 215 uses the TCP/IP communication module 216, described later, to provide a communication function to the module 217 and the module 218 in the universal send module 204. Likewise, the SLM module 215 also provides a communication function to the remote copy scan module 209 and the remote copy print module 210.

Reference numeral 216 denotes the TCP/IP communication module. The TCP/IP communication module 216 uses a network driver 217 to provide a network communication function to a variety of the aforementioned modules. The network driver 217 serves to control units physically connected to a network.

Reference numeral 218 denotes a controller API. The controller API 218 provides the upstream modules such as the universal send module 204 with an interface to the downstream modules such as a job manager module 219 described below. This reduces the dependence relationship between the upstream modules and the downstream modules, making it possible to improve general-purpose properties of each module.

Reference numeral 219 denotes a job manager module. The job manager module 219 interprets various types of processing specified through the controller API 218 by a variety of the aforementioned modules, and gives the instructions to each of the modules 220, 224, and 226 described below. The job manager module 219 unifies the management of hardware processing executed in the image processing device 110.

Reference numeral 220 denotes a CODEC manager module. The CODEC manger module 220 manages and controls a variety of data compression/decompression in the processing specified by the job manager module 219.

Reference numeral 221 denotes a FBE encoder module. The FBE encoder module 221 compresses, using a FBE format, the data read in the scan processing executed by the job manager module 219 or a scan manager module 224 described later.

Reference numeral 222 denotes a JPEG CODEC module. The JPEG CODEC module 222 performs JPEG compression processing on the data read in the scan processing executed by the job manager module 219 or the scan manager module 224. Likewise, the JPEG CODEC module 222 also performs JPEG development processing on print data in the print processing executed by the print manager module 226.

Reference numeral 223 denotes a JBIG CODEC module. The JBIG CODEC module 223 performs JBIG compression processing on the data read in the scan processing executed by the job manager module 219 or the scan manager module 224. Likewise, the JBIG CODEC module 223 also performs JBIG decompression processing on print data in the print processing executed by the print manager module 226.

Reference numeral 229 denotes a color-space-conversion and image-size-conversion module. The color-space-conversion and image-size-conversion module 229 is provided for the image processing performed between the described-above CODEC processing.

Reference numeral 224 denotes a scan manager module, which manages and controls the scan processing specified by the job manager module 219. The communication between the scan manager module 224 and the scanner 113 internally connected to the image processing device 110 is made through a Serial driver 225.

Reference numeral 226 is a print manager module, which manages and controls the print processing specified by the job manager module 219. The interface between the print manager module 226 and the printer 114 is provided by an engine interface module 227. In addition, a parallel port driver 228 is mounted, which provides an I/F for outputting data to an output device (not shown) through a parallel port.

Reference numeral 230 denotes a config manager. The config manager 230 manages initial set values. The config manager 230 retains and manages set values in the control processing specified by the controller API 218, and refers to them when each of the aforementioned modules is operated.

Reference numeral 231 denotes a group setting manager. The group setting manager 231 is associated with a group processing component 318 described later. The function of the group processing component 318 can be implemented through software processing alone. FIG. 2 shows the group setting manager 231 expressed by the dashed line when serving as a software processing module.

Description of Application Component

The aforementioned modules 201 to 211 run as application programs on the image processing device 110. Each of the application programs can be launched, suspended or deleted. The controller API module 218 is a layer that smoothes out discrepancies between different models such that the application program correctly runs even on different image processing devices. Accordingly, the application program can be executed in common in the platform unit 20.

Figure 3:
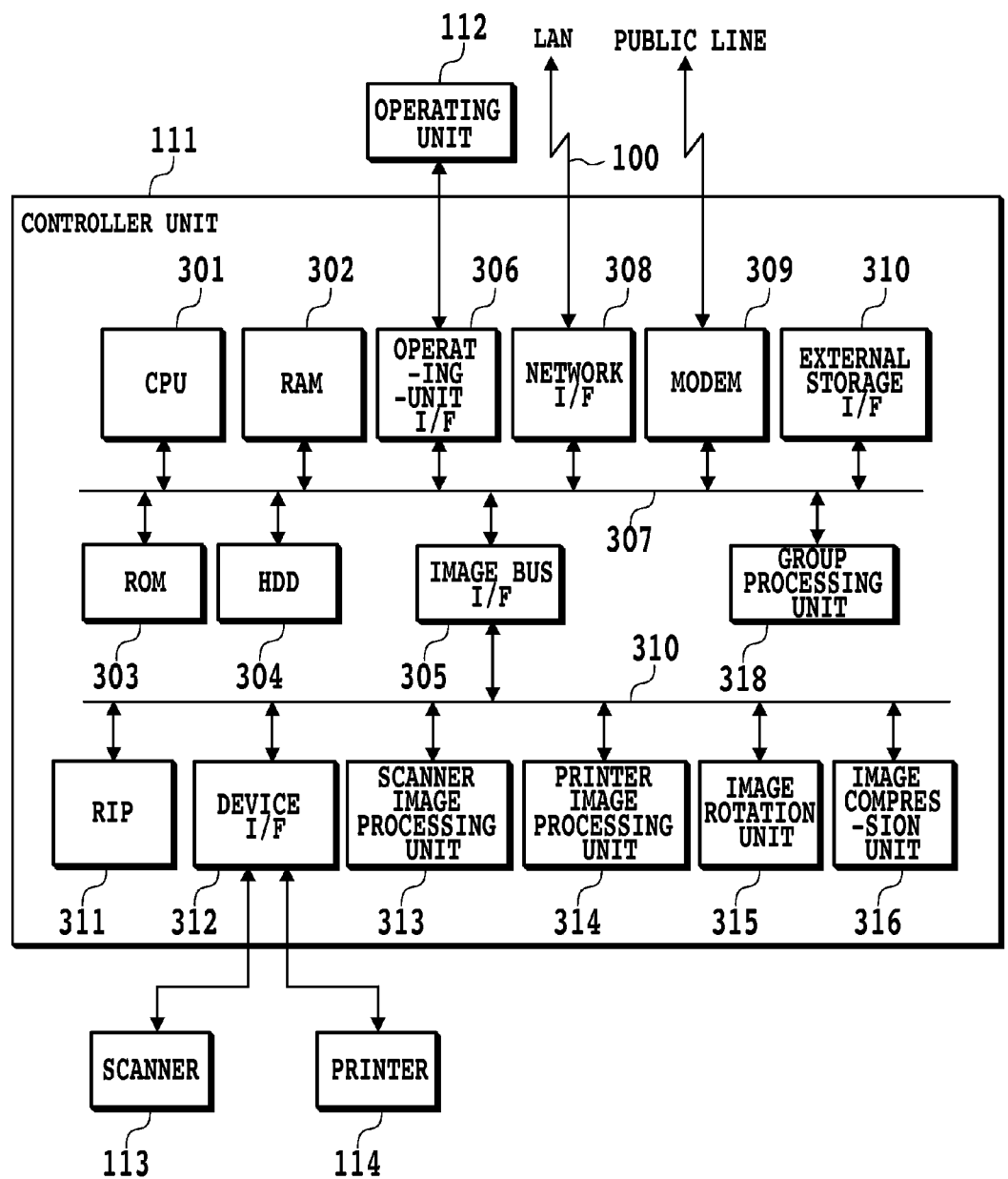
FIG. 3 is a block diagram illustrating the outline of the hardware configuration of the image processing device in the first embodiment.

FIG. 3 is a block diagram illustrating the outline of the hardware configuration of the image processing device in the present embodiment.

Description of Hardware Configuration of Image Processing Device

Reference numeral 111 denotes a controller unit controlling the entire device. The controller unit 111 is connected to the scanner 113 which is an image input device and the printer 114 which is an image output device, and controls them. The controller unit 111 is also connected to a LAN and a public line, and produces an input/output of image information and device information through them. The controller unit 111 comprises a CPU 301.

The CPU 301 is connected through a system bus 307 to a RAM 302, a ROM 303, a HDD 304, an image-bus I/F 305, an operating-unit I/F 306, a network I/F 308 and a modem 309.

The RAM 302 is a memory for providing a work area of the CPU 301, and also is employed as an image memory for temporarily storing image data.

The ROM 303 is a boot ROM, an stores a system boot program therein.

The HOD 304 is a hard disc device, and stores system software, image data and the like therein.

The operating-unit I/F 306 is an interface for producing an input/output between the operating unit 112 and the controller unit 111. The operating-unit I/F 306 fulfills the functions of outputting image data to be displayed on the operating unit 112 to the operating unit 112, passing the information entered through the operating unit 112 by the user to the CPU 301, and the like.

The network I/F 308 is connected to a LAN, and produces an input/output of information such as reception/transmission of various items of information from/to an external device. The modem 309 is connected to a public line, and produces an input/output of information from/to the public line.

The image-bus I/F 305 serves as a bus bridge which provides a connection between the system bus 307 and an image bus 310 providing image data transfer at high speeds for data structure conversion.

The image bus 310 is connected to a RIP (Raster Image Processor) 311, a device I/F 312, a scanner image processing unit 313, a printer image processing unit 314, an image rotation unit 315, and an image compression unit 316.

The RIP 311 expands PDL code received through the LAN into a bitmap image.

The device I/F 312 performs the connection of the scanner 113 and the printer 114 with the controller unit 111 and performs synchronous/asynchronous image-data conversion.

The scanner image processing unit 313, for example, corrects, processes and edits the input image data.

The printer image processing unit 314 performs printer correction, resolution conversion, and the like, on print-out image data.

The image rotation unit 315 rotates image data.

The image compression unit 316 performs JPEG compression/decompression processing on multilevel image data, and performs, for example, JBIG, MMR or MH compression/decompression processing on binary image data.

An external storage I/F 317 is a serial I/F for connection to memory media, which is used for saving the data and image stored in the device in the memory media or writing the data read from the memory media in the device.

A group processing component 318 performs processing of selecting and grouping together some image processing devices with a commonality of the setting items (and set values) of the application from the plurality of image processing devices connected to each other through a network (communication line). In addition, the group processing component 318 performs a set of processing related to the grouping, such as omission of an arbitrary device from the group or addition of an arbitrary device to the group. As described above, the processing related to the grouping can be implemented as software processing using the group setting manager 231.

Description of Setting Items of Application for which Setting Management is Performed FIG. 4 is an example of a list of setting items of an application employed in the image processing device for which the setting management in the present embodiment is performed. The setting items are roughly grouped into categories 401 to 407.

Category 401 comprises setting items in common in an entire image processing device and relates to operational control of the entire device. Category 402 comprises setting items related to a copy operation or a scan operation. Category 403 comprises setting items related to a network required for connection to a network. Category 404 comprises cost-saving specification settings for reducing the amounts of power consumption and paper consumption. Category 405 comprises setting items required for receiving/transmitting data such as by E-mail, fax, and the like. Category 406 comprises report specifications, and contains setting items for a report about histories such as of transmission results and reception results. In addition, there are setting items grouped into category 407 for management of the entire system.

Regarding the setting items, the aforementioned set-value management module 230 manages an initial set value and a present set value corresponding to each of the setting items. The address book module 202 manages a part of the set values.

As described above, the platform unit 20 is shared, so that a common application program, which is not generated for each image processing device, is commonly operated in the platform unit 20. However, it is necessary to correctly configure the aforementioned settings for the purpose of normal behavior of the application program. In addition, it is necessary to optimally set a set value corresponding to each setting item in accordance with the configuration inherent in the image processing device such as screen size, storage type and processing performance, and with optional configurations such as of a double-sided unit, a finish unit and the like.

Conventionally, a device manager or a serviceman has a grasp of the aforementioned configuration of each of a plurality of devices on a network, and configures settings individually in accordance with the configuration of each device. In addition, when an operation check job is executed in order to verify that the setting which has been changed by the device manager or the serviceman is correct, it is necessary to individually carry out verification for each application in accordance with device conditions, thus increasing the device management cost.

It is an object of the present invention to achieve collective setting and collective management on a group-by-group basis by dynamically dividing a plurality of image processing devices on a network into groups.

Description of Operational Outline of Image Processing Device

Figure 5A:
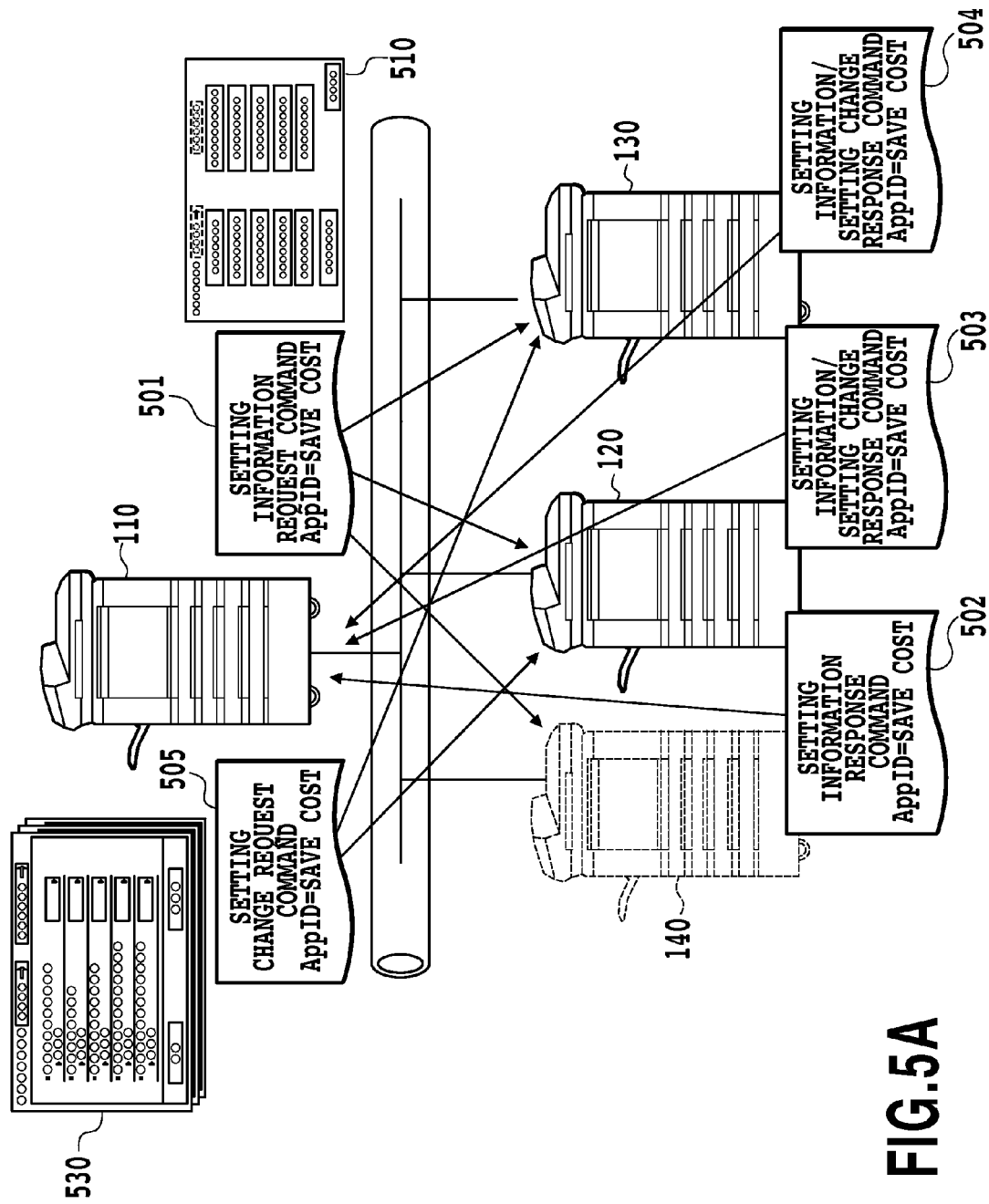
FIG. 5A is a diagram illustrating the outline of the application setting management system relating to the first embodiment.

Referring next to FIG. 5, the outline of the application setting management system according to the present embodiment will be described.

Figure 5B:
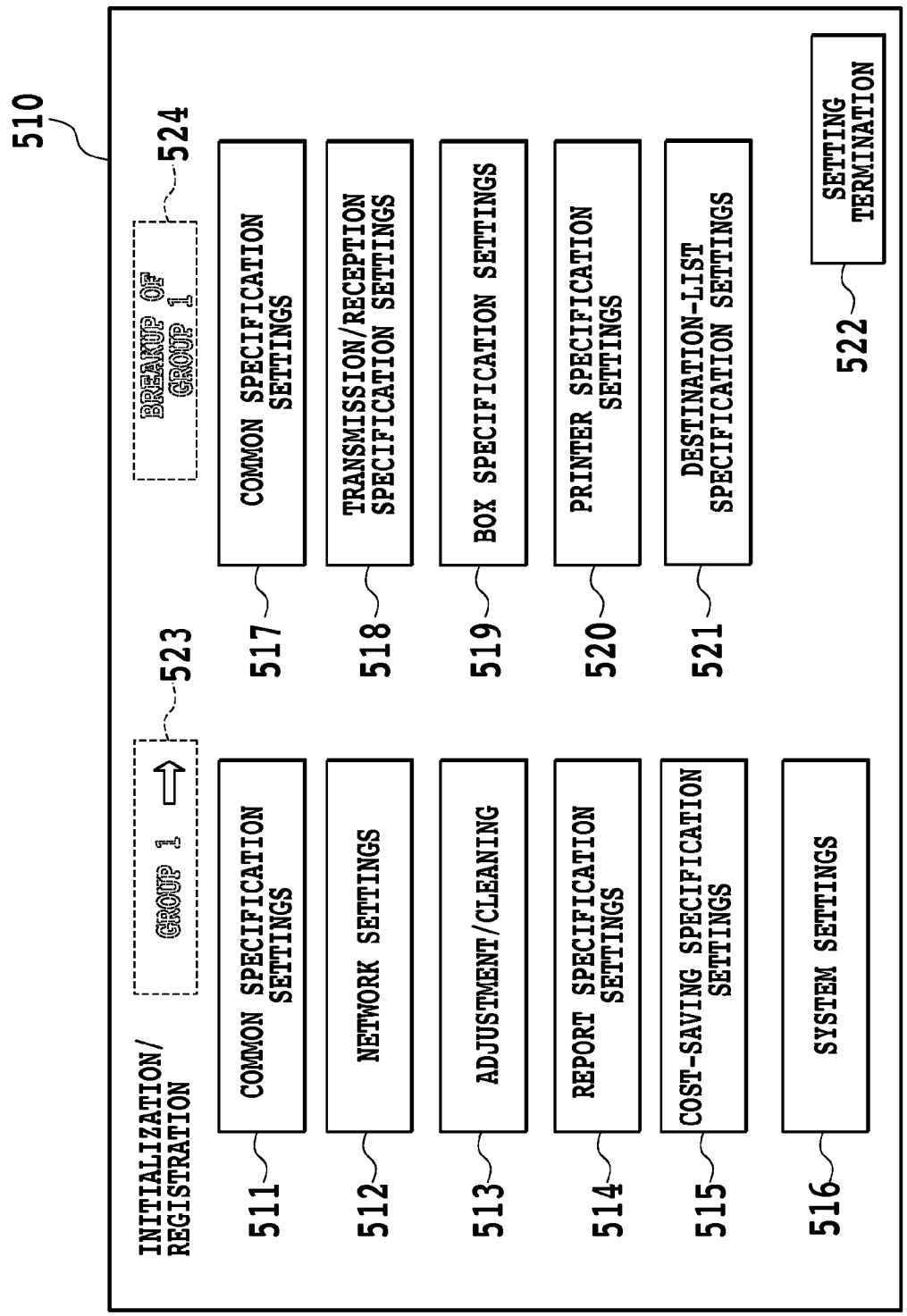
FIG. 5B is a diagram showing an example of an initial screen.

In FIG. 52A, the image processing device 110 on a network acts as a management apparatus for configuring settings for applications in the image processing devices 120, 130, and 140 on the same network. FIG. 5B is a diagram showing an initial screen 510 for receiving instructions from the user and starting settings for an application. The initial screen 510 displays buttons 511 to 521 corresponding to settings such as adjustment/cleaning setting, box use setting, printer specification setting and destination-list specification setting in addition to the setting items listed in FIG. 4 by way of example. It goes without saying that the setting items displayed on the initial screen 510 can be arbitrarily selected and determined based on the functions and performances of each device.

When the user selects any setting item on the initial screen 510, the image processing device 110 acquires information in regard to the selected setting item and the set value thereof from the image processing devices 120 to 140 on the network. Specifically, the image processing device 110 generates a setting information request command 501 and transmits it to the image processing devices 120 to 140. The setting information request command 501 includes an identification ID for identifying the application of the selected setting item, that is, "SaveCost" corresponding to the cost-saving specification setting as the identification ID. When the identification ID in the received setting information request command 501 agrees with the identification ID of the device itself, the image processing devices 120 to 140 generate setting information response commands 502 to 504 including information on the set value of the setting item, and transmit them to the image processing device 110.

The image processing device 110 analyzes the received setting information response commands 502 to 504, and groups (or individuates) the image processing devices 120 to 140 based on the result of the analysis. The present embodiment provides, as an example, the case when the image processing devices 120 and 130 are grouped together and the image processing device 140 is not grouped (is individuated).

The image processing device 110 generates a setting screen 530 in accordance with the result of the grouping and displays it on the operating unit 112 (on the user interface).

When the user enters a desired set value for the grouped image processing devices 120 and 130 through the setting screen 530, the image processing device 110 generates a setting change request command 505 based on the entered contents, and then transmits it to the image processing devices 120 and 130.

Each of the image processing devices 120 and 130 changes the set value in accordance with the received setting change request command 505. After the setting change, the image processing devices 120 and 130 respectively generate setting change response commands 503 and 504 and then transmit them to the image processing device 110.

The image processing device 110 analyzes the received setting change response command, and, as necessary, performs the re-grouping of the image processing devices 120 to 140. FIG. 5 shows the earlier grouped state and does not show the re-grouped state. However, if the image processing devices are re-grouped, a setting screen generated in accordance with the result of the new re-grouping is displayed on the operating unit 112.

The button 522 is pressed down after the completion of the application settings, whereupon the initial screen 510 is closed.

The buttons 523 and 524 shown by the dotted line in FIG. 5B will be described later.

Description of Setting Screen

Figure 6:
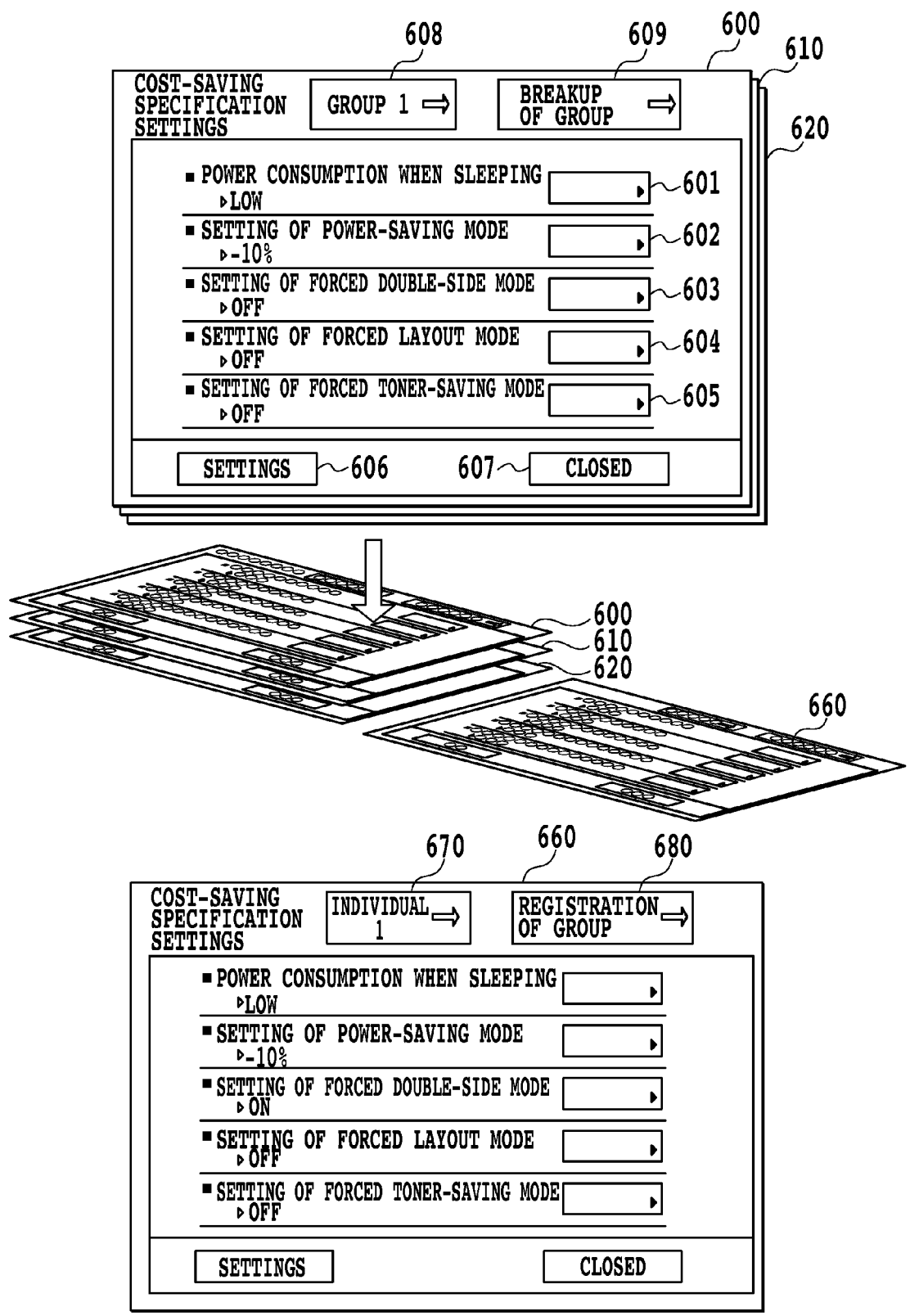
FIG. 6 is a diagram showing examples of setting screens.

FIG. 6 is a diagram showing an example of a setting screen for collectively configuring settings in the grouped devices. Here, an example of a setting screen for configuring the cost-saving specification setting is described.

In the setting screen 600, subordinate setting items included in the cost saving specification setting (hereinafter referred to as "subordinate items") are displayed. In each subordinate item a set value and the like are displayed. For example, in the subordinate item "setting of power saving mode", "−10%" is displayed as a set value, which shows the setting is configured at the present time such that a 10 percent power saving is produced. Reference numerals 601 to 605 denote buttons for moving to a sub screen for changing the setting contents of each subordinate item. For example, by pressing the button 602, a sub screen for inputting a set value (not shown) is displayed. Then, if "−15" is input in this sub screen, the set value display is switched from the current "−10%" to "−15%" on the setting screen 600. Reference numeral 606 denotes a setting button. By pressing the setting button 606, a setting change request command for instructing a change to the input setting contents is transmitted to each image processing device in the group. Reference numeral 607 is a button for closing the setting screen opening at that time. By pressing the button 607, the screen is returned to the initial screen 510.

For the purpose of showing the user the grouping of the devices in an easy-to-understand manner, screens 610 and 620 are displayed behind the setting screen 600 such that the screens 610 and 620 are arranged in a layered structure. In this example, the three screens are overlapping, which means there are three image processing devices in which power consumption in the sleeping state is set at "low", the power-saving mode is set at "−10%", and the forced double-side mode, the forced layout mode, and the forced toner-saving mode are set to "OFF". If there are one or more single image processing devices which are not grouped, the setting screen of the image processing device is displayed as a regular screen without the layered structure (that is, one layer screen). Reference numeral number 660 is a setting screen of an image processing device which is not grouped because the forced double-side mode is set at "ON".

The processing is executed by pressing any of the buttons 601 to 607 on the setting screen 600 which is interpreted as indicating that the corresponding buttons in the underlying setting screens 610 and 620 are simultaneously pressed.

Reference numeral 608 is a button for switching the setting screen to one designated for another group of image processing devices (or for an individuated device not making up part of a group). On the button 608 the name of the group currently displayed on the setting screen is displayed. That is, "group 1" in the button 608 is the name of the group related to the currently open setting screen. The arrow "→" shows the existence of another group to which a display can be switched (or an individuated single device). Whenever the button 608 is pressed, the display transitions from one group to the next group and the name representing the group after transition is displayed (for example, "group 2"). If the group 2 is made up of two image processing devices, the three-layer display of the setting screen is changed to the two-layer display. In this example, another group does not exist and the number of individuated single devices is only one. For this reason, by pressing the arrow "−→", "individual 1" is displayed, resulting in transition to a screen without the layered structure. The button 670 is a switching button on the setting screen 660, which corresponds to the button 608.

The layout form of a plurality of screens overlapping in a layered structure has been described as a display method for showing the grouped state, but the display method is not limited to this. Nevertheless, a desirable display method makes the user intuitively know that the devices are grouped.

Reference numerals 609 and 680 respectively denote buttons for breaking up and registering a group. On the setting display generated for grouped image processing devices, "breakup of group 1" is displayed for breaking up the group of devices (button 609). On the other hand, on the setting display generated for a single image processing device which is not grouped, "registration of group" is displayed for grouping the devices (button 680). If the button is pressed in a state displaying the "breakup of group 1", the group 1 is broken up, and then the display is changed from "breakup of group 1" to "individual N". Here, N is an arbitrary integer, which indicates the number of devices forming the group. In reverse, if the button is pressed in a state of displaying "registering for group", the screen is transitioned to a screen allowing the user to select a group for registration (not shown).

For reference, when all the subordinate items can not be displayed on one screen because there are a large number of subordinate items, the setting screen may be made up of a plurality of pages and a page change button (not shown) may be provided for changing the pages.

From Request of Setting Information to Display of Setting Screen

Figure 7A:
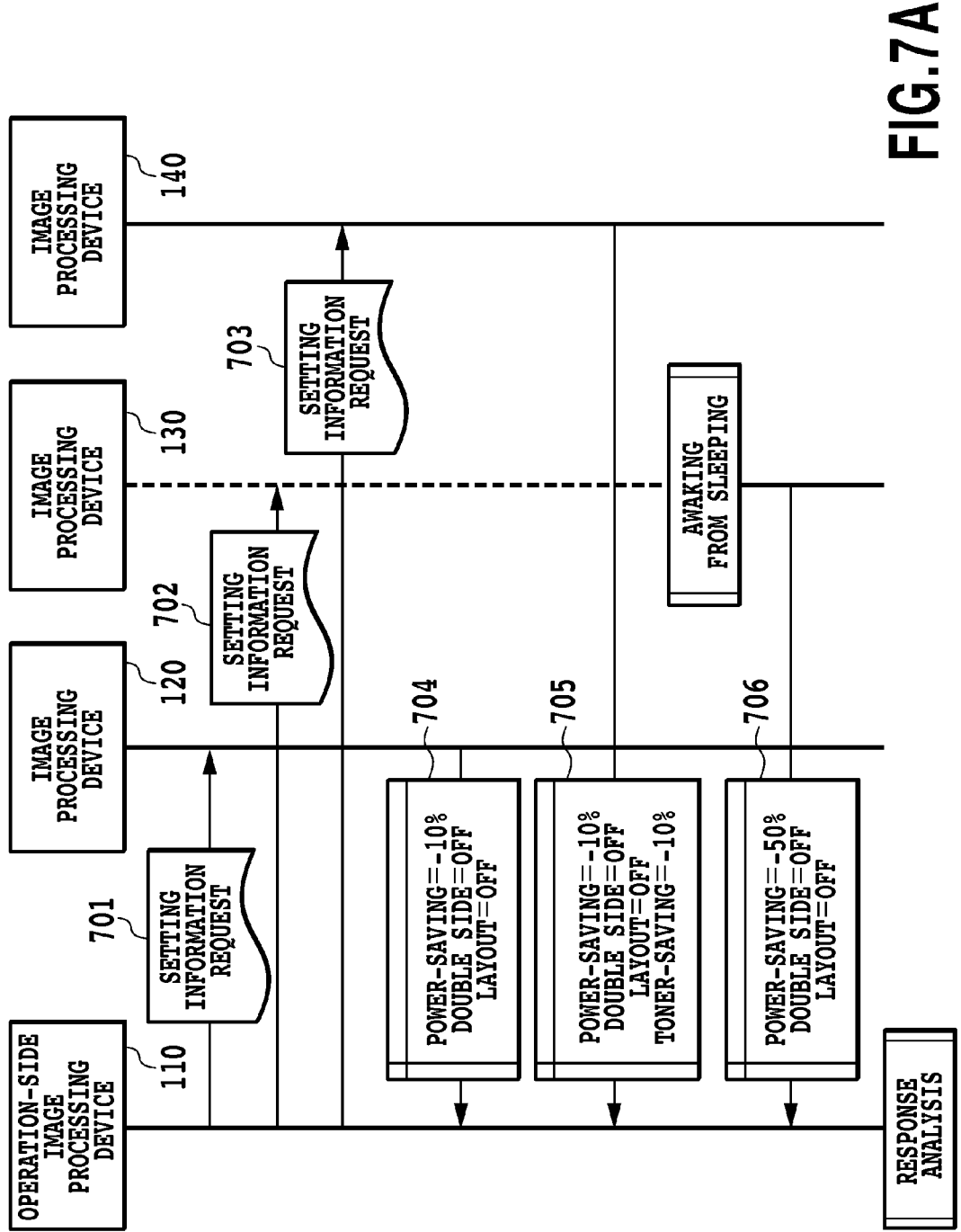
FIG. 7A is a diagram illustrating the flow of processing for retrieving information in regard to setting items.

FIG. 7A is a conceptual diagram showing the flow of the processing for the image processing device 110 to obtain information in regard to setting items from the three image processing devices 120 to 140. Specifically, FIG. 7A describes details of the processing performed in the group processing component 318 in the image processing device 110 when the information on the setting items is obtained.

Figure 14:
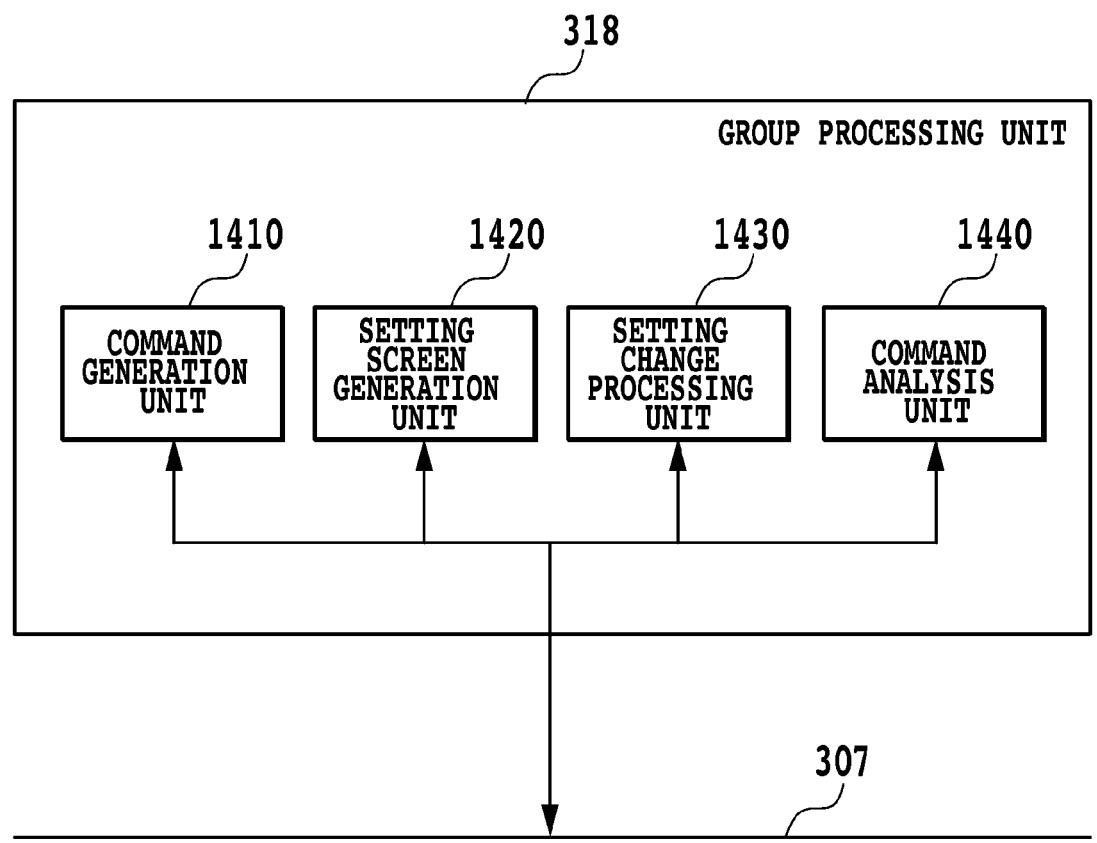
FIG. 14 is a diagram illustrating the internal configuration of a group processing component 318.

FIG. 14 is a diagram showing the internal configuration of the group processing component 318. The group processing component 318 comprises a command generation unit 1410, a setting screen generation unit 1420, a setting change processing unit 1430 and a command analysis unit 1440. It should be noted that, in the present system, any image processing device on the network has the ability to act as either a managing device or a managed device. Therefore, a description is given on the assumption that all the image processing devices on the network have a group processing component 318. It goes without saying that an image processing device specially designed to be managed may be included. In this case, however, it is necessary for this image processing device to have the minimum function of the group processing component 318 required when managed. That is, it is necessary to have the function of receiving and analyzing a setting information request command, the function of generating and transmitting a setting information response command, the function of receiving and analyzing a setting change request command, the function of reflecting the setting, and the function of generating and transmitting a setting change response command. The same goes for an image processing device specially designed to manage. That is, it is necessary to have, at a minimum, the function of generating and transmitting a setting information request command, the function of receiving and analyzing a setting information response command, the function of generating and displaying a setting screen, the function of generating and transmitting a setting change request command, and a function of receiving and analyzing a setting change response command.

Initially, in response to the selection of an arbitrary setting item from the initial screen 510 by the user, the command generation unit 1410 generates a command for requesting setting information on the selected setting item (setting information request command). Then, the network I/F 308 transmits the generated setting information request command to the image processing devices 120 to 140. FIG. 7A shows an example when the setting item of "cost-saving specification setting" is selected, in which the setting information request commands 701 to 703 for the selected setting item are respectively transmitted to the image processing devices 120 to 140. The setting information request command will be described in detail later.

Then, the command analysis unit 1440 of each of the image processing devices 120 to 140 extracts set-value information in regard to all subordinate items included in the cost-saving specification setting on the basis of the setting information request command 701, 702, and 703 received through the network I/F 308.

Specifically, the command analysis unit 1440 extracts information on the presence or absence of each subordinate item such as those in the list given in Category 404 in FIG. 4 and on the present set values of the existing subordinate items. Then, the command generation unit 1410 generates a setting information response command 704, 705, and 706 including the information on the extracted subordinate items and the set values thereof. The setting information response command 704, 705, and 706 thus generated is transmitted through the network I/F 308 to the image processing device 110. For reference, there may be cases where the setting information response command cannot be immediately sent back because of the sleeping state of the device as in the case of the image processing device 130. In such a case, until the setting information response commands return from all the image processing devices to which the setting information request commands have been transmitted (in this case, the devices 120 to 140), the image processing device 110 may be kept in a standby state, for example. In the example shown in FIG. 7, the image processing device 130 transmits the setting information response command 706 after awaking from its sleeping state. For this reason, the image processing device 110 waits for the command 706 from the device 130, and then performs the next analysis processing for the setting information response commands. Incidentally, the setting information response command will be described later in detail.

Subsequently, the command analysis unit 1440 of the image processing device 110 analyzes the setting information response commands 704 to 706 received through the network I/F 308. Then, the command analysis unit 1440 checks what subordinate items each of the image processing devices 120 to 140 has and what the set values for the subordinate items are in relation to the cost-saving specification setting. From a comparison between the setting information response commands 704 and 706, it is seen that all the subordinate items are common to the commands 704 and 706, but the set values in "the setting of the power saving mode" differ, for example, the command 704 indicates "−10%" but the command 706 indicates "−50%". Commonalities between the setting information response commands 704 and 705 are "the setting of the power-saving mode", "the setting of the forced double-side mode", and "the setting of the forced layout mode" and the set values for them. However, the command 705 differs in that it has "the setting of the forced toner-saving mode". The setting information response commands 705 and 706 are identical in "the setting of the forced double-side mode" and "the setting of the forced layout mode", but differ in the set value for "the setting of the power-saving mode". Only the command 705 differs in that it has "the setting of the forced toner-saving mode".

The setting screen generation unit 1420 of the image processing unit 110 groups together the image processing devices having the same set value for the same subordinate item on the basis of the above analysis result, and generates a setting screen in relation to the cost-saving specification setting as shown in FIG. 6.

Figure 7B:
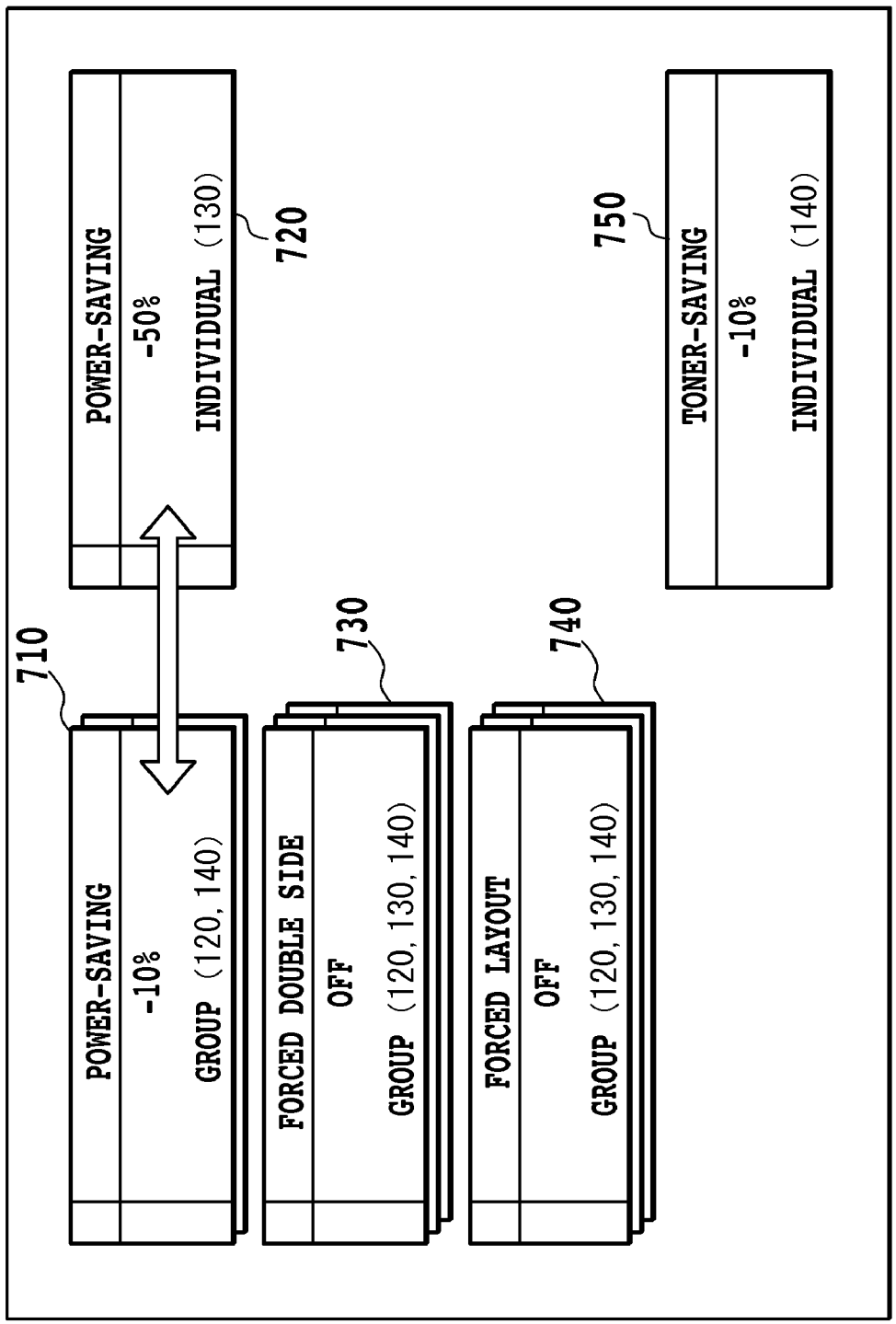
FIG. 7B is a schematic diagram showing a setting screen.

FIG. 7B is a schematic diagram showing another example when the setting screen is generated based on the obtained information on the cost-saving specification setting on a subordinate item-by-subordinate item basis. In this case, a button (not shown) is separately provided for switching the screen between subordinate items. On such a setting screen, the setting can be collectively changed on a subordinate item-by-subordinate item basis for devices grouped by each subordinate item. The system may be designed to allow the user to further select through the user interface whether the setting screen as illustrated in FIG. 6 or the setting screen based on each subordinated item as illustrated in FIG. 7 is generated.

For reference, only information on desired subordinate items may be acquired from the beginning for the grouping of the devices and the setting screen related to the subordinate items alone may be generated. In this case, after the user has selected an arbitrary setting item on the initial screen, a screen showing subordinate items relating to the selected setting item may be displayed and then a setting information request command may be generated at the time when a certain subordinate item is selected from the displayed subordinate items. Further alternatively, information on all the setting items displayed on the initial screen may be obtained for the grouping of the devices, and then a setting screen may be generated in order to perform collective setting change regarding all the setting items. In this case, a button (not shown) may be separately provided for obtaining the setting information on all the setting items displayed on the initial screen. Then, when this button is pressed, a setting information request command may be generated. The setting screen produced for the collective setting change regarding all setting items may be, for example, a screen similar to the initial screen 510 including the group switching button 523 and the button 524 for breaking up a group which are indicated by the dot lines in FIG. 5B. In a main setting screen as shown in FIG. 5B, common set values for all the setting items corresponding to boxes 511 to 521 can be collectively set.

Reference numeral 710 in FIG. 7B denotes a setting screen for the grouped image processing devices 120 and 140 to which the set value for the power-saving mode is common. When the user presses the button for switching the groups (corresponding to 608 in FIG. 6, but not shown in FIG. 7), a transition from the setting screen 710 to the setting screen 720 without a layer structure in relation to the image processing device 130 is displayed.

Likewise, when the user selects a subordinate item "the setting of the forced double-side mode" or "the setting of the forced layout mode" as an item of the setting change, the operating unit 112 displays the setting screen 730 or 740 for the grouped image processing devices 120, 130 and 140.

When the user selects a subordinate item "the setting of the toner-saved mode" as an item of the setting change, the operating unit 112 in the image processing device 110 displays the setting screen 750 without a layer structure in relation to the image processing device 140.

Description of Setting Information/Setting Change Request Command

Figure 12:
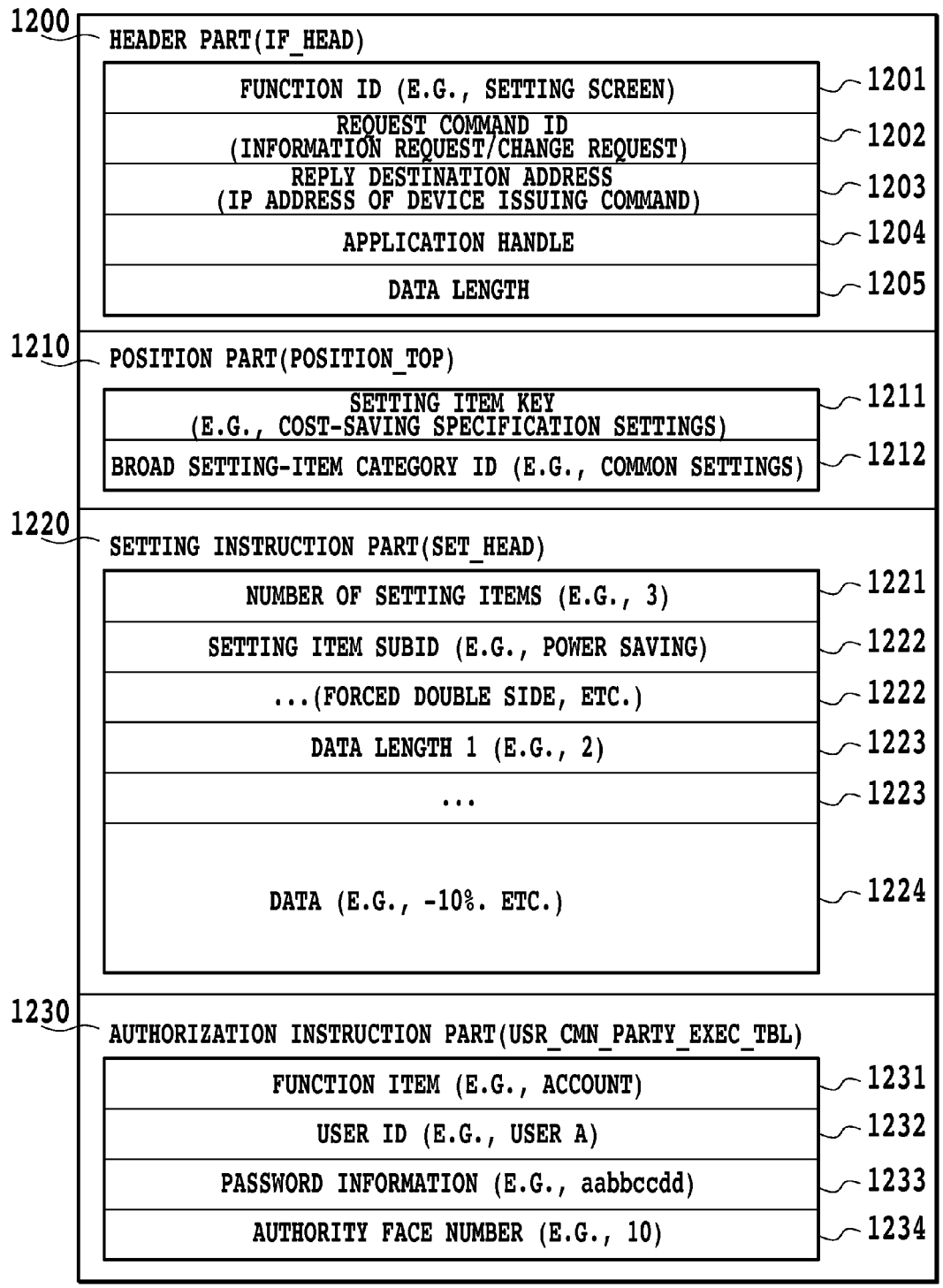
FIG. 12 is a diagram illustrating the structure of a setting information request command and a setting change request command.

FIG. 12 is a diagram illustrating the structure of a setting information request command and a setting change request command.

A header part 1200 comprises a function ID 1201, a request command ID 1202, a reply destination address 1203, an application handle 1204 and a data length 1205. The function ID 1201 is an identifier indicating which function relates to the command, for example, an identifier of a setting screen is assigned thereto. The request command ID 1202 is an identifier indicating a command class, for example, whether the command is for requesting information on setting items and set values or for requesting a change/clear of a set value. The reply destination address 1203 is assigned an IP address of an image processing device issuing a command (for example, the image processing device 110 in FIG. 7). The application handle 1204 is assigned an identifier for uniquely identifying the command from which application. The data length 1205 is an area for indicating a data size of the entire command including the header.

A position part 1210 comprises a setting item key 1211 and a broad setting item category ID 1212. The setting item key 1211 is a character string indicating a setting item selected on the initial screen 510 by the user, such as "cost-saving specification setting. A plurality of setting item keys 1211 is required when a plurality of setting items is set. The broad setting item category ID 1212 is an identifier for identifying a setting item when there is a broad category to which the setting item key 1211 belongs.

A setting instruction part 1220 is a data area included when the request command ID 1202 is for "change request". The setting instruction part 1220 comprises a setting item number 1221, a setting item SUBID 1222 numerically equal to the number of setting items, a data length 1223 numerically equal to the number of setting items, and a setting data group 1224. The setting item number 1221 indicates the number of items to be set based on the setting item keys. The setting item SUBID 1222 is an identifier for uniquely identifying an item to be set. The data length 1223 indicates a data size for each item to be set. The setting data group 1224 is assigned data on set values numerically equal to the number of items to be set.

An authorization instruction section 1230 comprises a function item 1231, a user ID 1232, a password information 1233, and an authorization face number 1234. The function item 1231 is an identifier indicating access to which function setting item. The user ID 1232 is an identifier for uniquely identifying the user having access. The password information 1233 is assigned a character string representing a password to prevent user impersonation. The authorization face number 1234 is assigned set value data for changing the set value of the upper limit of pages, when the function setting item 1231 shows the upper limit of printed or read pages.

Description of Setting Information/Setting Change Response Command

Figure 13:
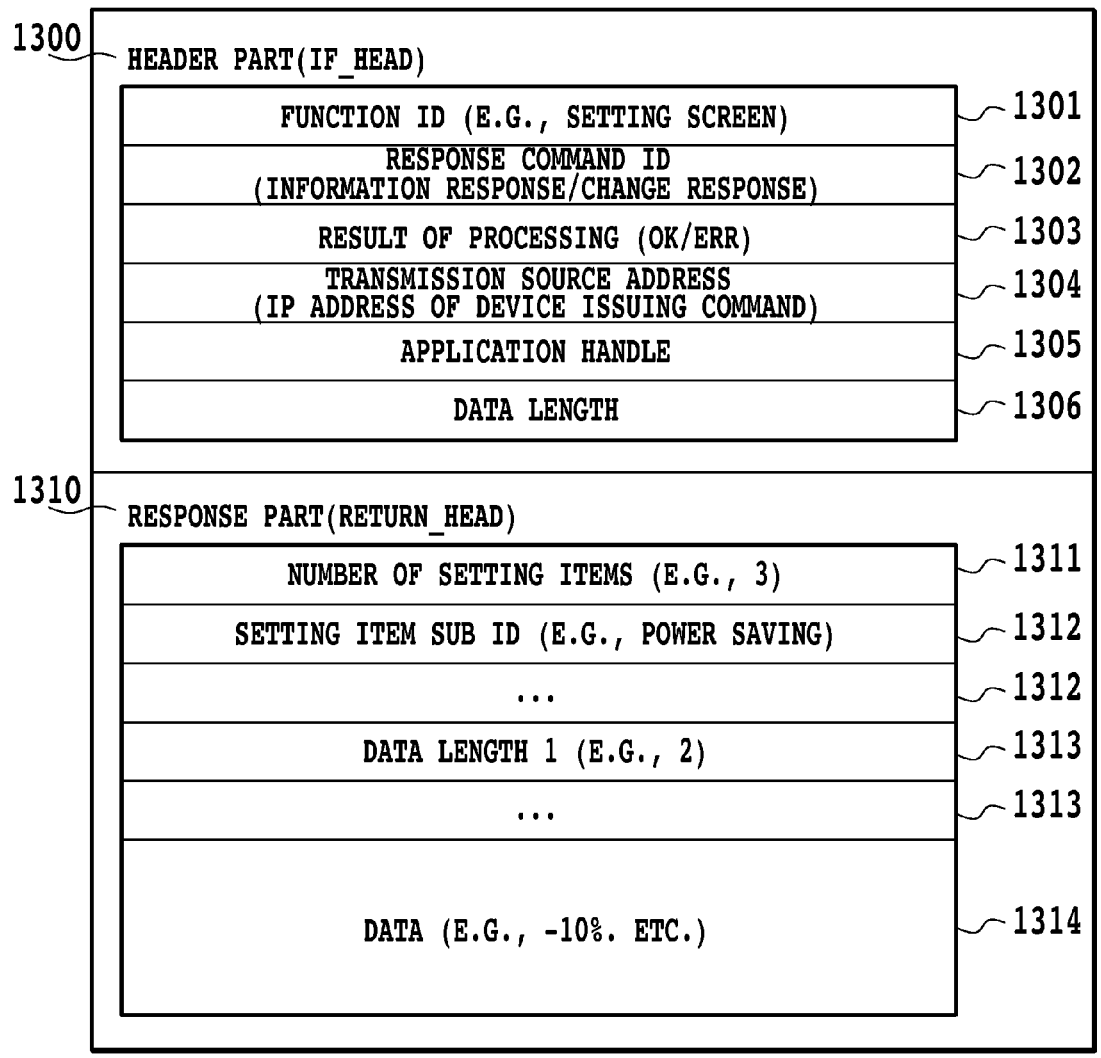
FIG. 13 is a diagram explaining the structure of the setting information response command and the setting change response command.

FIG. 13 is a diagram illustrating the structure of a setting information response command and a setting change response command.

A header part 1300 comprises a function ID 1301, a response command ID 1302, a processing result 1303, a transmission source address 1304, an application handle 1305 and a data length 1306. The function ID 1301 is an identifier indicating which function relates to the command, for example, an identifier of a setting screen is assigned thereto.

The response command ID 1302 is an identifier indicating a command class, for example, whether the command is a response to a request for setting information or a response to a request to change a set value or to clear a set value.

The processing result 1303 is an area for indicating whether or not the processing has been successfully performed in response to the request for setting information or the request to change a set value. For example, the successful processing results in "OK", whereas the unsuccessful processing results in "ERR".

The transmission source address 1304 indicates an IP address of the image processing device that issues a command (for example, the image processing devices 120 to 140 in FIG. 7). The application handle 1205 is an identifier for uniquely identifying the command from which application. The data length 1306 is an area for indicating a data size of the entire command including the header.

A response part 1310 comprises a setting item number 1311, a setting item SUBIDs 1312 numerically equal to the number of setting items, a data length 1313 numerically equal to the number of setting items, and a data group 1314. The setting item number 1311 indicates the number of setting items set at the moment or setting items after a change in setting. The setting item SUBID 1312 is an identifier for uniquely identifying a setting item set at the moment or after a change in setting. The data length 1313 indicates a data size for each setting item set at the moment or after a change in setting. The setting data group 1314 is assigned data on set values at the moment or after a change in settings which are numerically equal to the number of setting items.

Description of Processing in Device Set by Setting

Figure 8:
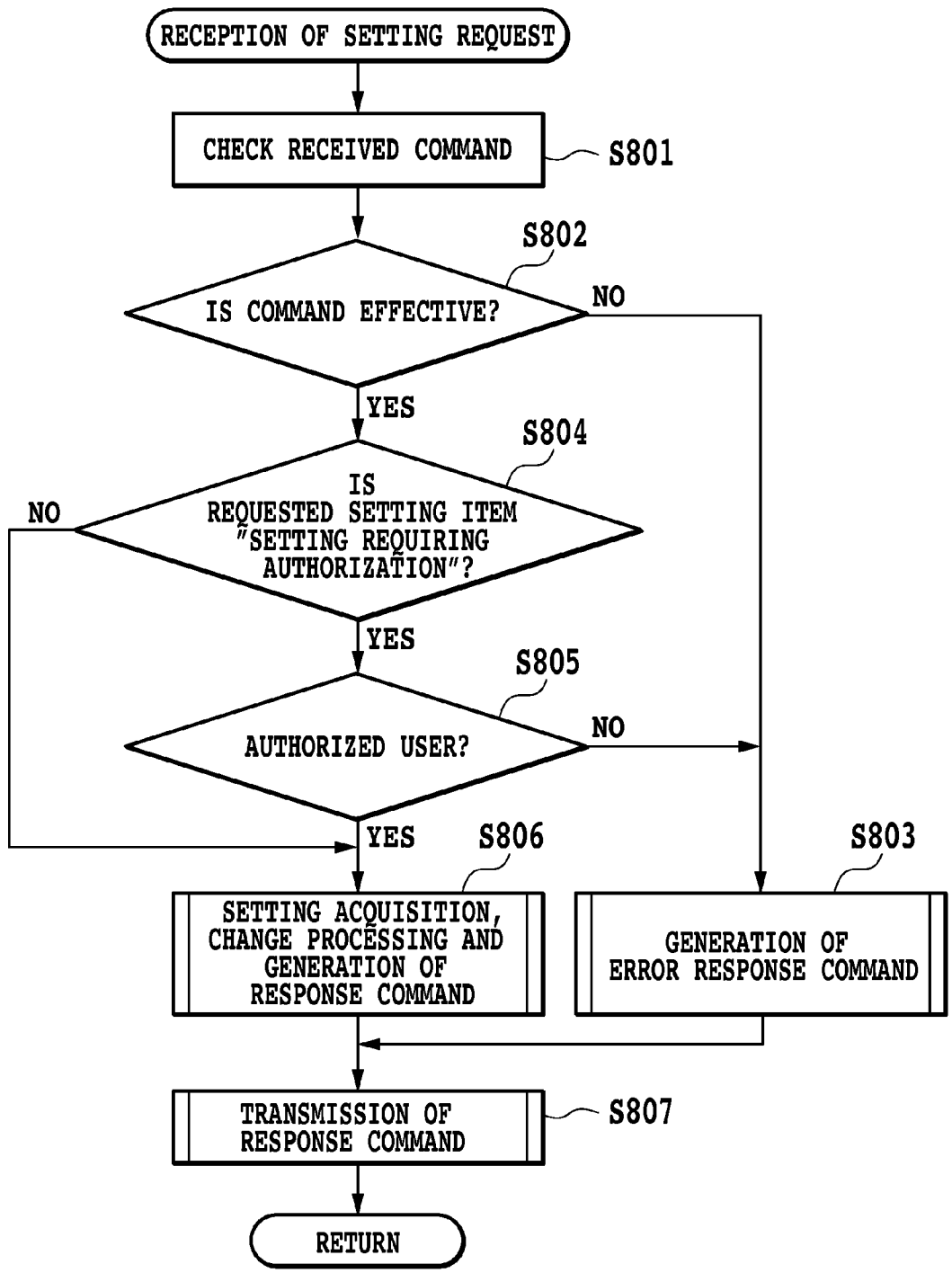
FIG. 8 is a flowchart showing the processing from reception of a setting information/setting change request command to transmission of a setting information/setting change response command.

FIG. 8 is a flowchart showing the processing from reception of a setting information/setting change request command to transmission of a setting information/setting change response command in the image processing devices 120 to 140 which are set by settings of an application (which are managed).

Initially, at step S801, the command analysis unit 1440 checks a received setting information/setting change request command to determine the effectiveness of the received command. That is, the command analysis unit 1440 determines whether or not the command is corrupted and the same application as that used for generating the command runs on its image processing device. The application is identified by referring to the aforementioned application handle 1204.

At S802, the command analysis 1440 determines whether or not the command is effective on the basis of the check result. If it is determined that the command is not effective, the procedure goes to step S803.

At step S803, the command generation unit 1420 generates a setting information response command or a setting change response command indicating an error. That is, a response command containing the processing result 1303 indicating [ERR] information is generated.

At step S802, if it is determined that the command is effective, the procedure goes to step S804.

At step S804, the command analysis unit 1440 determines whether or not certain authorization is necessary when the setting item specified by the setting information/setting change request command is referred to and changed. It should be noted that it is arbitrarily predetermined whether or not the setting item requires certain authorization. However, in general, the certain authorization is required by a setting item which will have a relative great effect after the setting is changed. Where the example in FIG. 4 is concerned, for example, the system manager setting 406, the network setting 403 and the like fit the above case. If the necessity of the certain authorization is determined, the procedure goes to step S805.

At step S805, the command analysis unit 1440 determines whether the user authorization is present or absent on the basis of information of the user ID 1232 and the authorization instruction part 1230 included in the setting information/setting change request command. Specifically, the determination is made by use of a method of comparing password information 1233 included in the command (for example, aabbccdd) with a secret number given to a pre-registered system manager or the like. If it is determined that there is no authorization, the process goes to step S803 where the command generation unit 1410 generates a setting information/setting change response command indicating the error.

If it is determined at step S804 that the certain authorization is unnecessary for a setting change or it is determined at step S805 that the user has authorization for changing the settings, the process goes to step S806.

At step S806, when the received command is a setting information request command and when it is a setting change request command, the following processing is respectively performed.

When the received command is the setting information request command, the command generation unit 1410 generates the setting information response command. Specifically, the command generation unit 1410 reads information of set values for each setting item managed by the Config Manager 230, and then generates the aforementioned setting information response command on the basis of the read information.

On the other hand, when the received command is a setting change request command, the setting change processing unit 1430 changes a set value for the designated setting item in accordance with the data included in the setting changed request command. Specifically, the setting change processing unit 1430 performs the processing of reading the information on set values for each setting item and changing the read value to this designated value for update. After the changing, the command generation unit 1420 generates the setting change response command indicating "OK".

At step S807, the setting information response command or the setting change response command thus generated is transmitted through the network I/F 308 to the image processing device 110.

When the received command is the setting information request command, the processing in each of steps S804 and S805 may be omitted. This is because, in the stage of referring to what type of setting is configured, there are very few cases where a problem may arise even when a permission to reference is given to a user who is not authorized to change.

From Setting Change Request to Display of Setting Screen After Regrouping

Figure 9A:
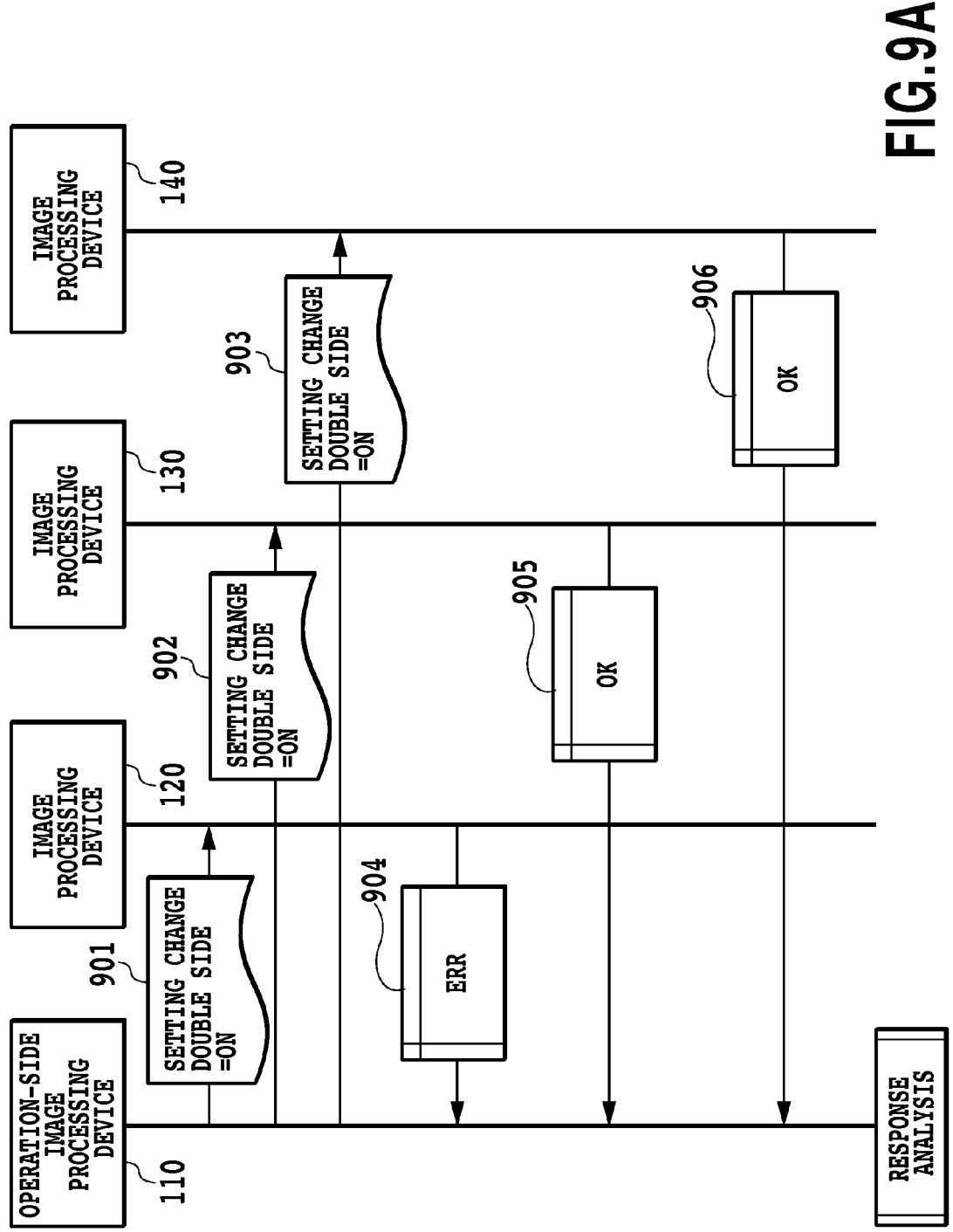
FIG. 9A is a diagram illustrating the processing performed when a request for setting change is made and FIG. 9B is a schematic diagram showing a setting screen for the regrouped devices.

FIG. 9 is a conceptual diagram showing the processing performed when the image processing device 110 receiving the setting information response command requests the grouped image processing devices to change settings.

First, upon the reception of a desired set value for an arbitral setting item entered on the setting screen by the user, the command generation unit 1410 of the image processing device 110 generates a command for requesting a setting change (setting change request command) in accordance with the entered contents. Then, the setting change request command thus generated is transmitted through the network I/F 308 to the image processing devices 120 to 140.

Reference numerals 901 to 903 in FIG. 92 denote setting change request commands when the set value for requesting a change of "the setting of the forced tow-side mode" from OFF to ON.

The image processing devices 130 and 140 change the set values in response to the change request specified by the received setting change request command. Then, the devices 130 and 140 transmit the setting change response commands 905 and 906 including the result of the change to the image processing device 110. Since the image processing device 120 can not execute the requested processing of changing the settings for some reason (for example, run-out of the paper on the feeder tray or the like), the image processing device 120 transmits the setting change response command 904 indicating an error to the image processing device 110.

The image processing device 110 analyzes each of the received setting change response commands, and then re-groups the image processing devices 120 to 140. That is, based on the information on set values reflecting the setting change, the image processing device 110 determines on a subordinate item-by-subordinate item basis again whether each of the image processing devices should be treated as one in a group or as an individual. As a result, the image processing device 110 generates and displays a new setting screen.

Figure 9B:
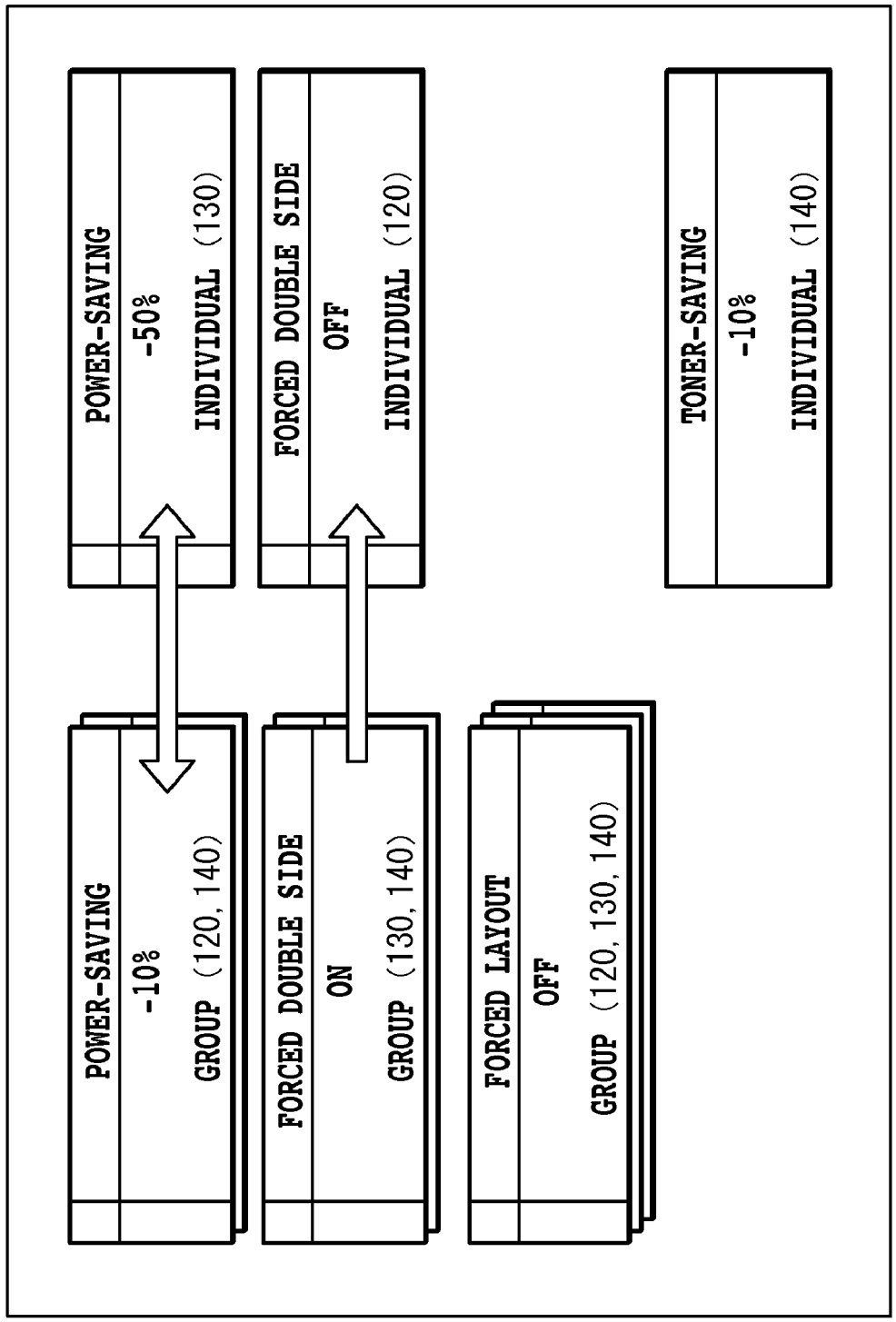

FIG. 9B is a schematic diagram of the setting screen shown in FIG. 7B which is newly generated after the re-grouping. The setting of the power-saving mode, the setting of the forced layout mode, and the setting of the forced toner-saving mode are the same before (state in FIG. 7B) and after the setting change. However, on the new setting screen, regarding the setting of the forced tow-side mode, the present set values in both the image processing devices 130 and 140 indicate "ON", thus grouping the devices 130 and 140 together. This is because the image processing device 120 can not respond to the request for changing the settings, and transmits the setting change response command indicating an error. As a result, the image processing device 120 is individualized.

In this manner, the image processing devices are re-grouped on the basis of the setting change response command, and then a setting screen reflecting the regrouped contents is displayed, thereby readily determining a device which is dropped from the group and individualized through the re-grouping. Accordingly, for example, a request of a certain group to make the setting of double-side printing is made, but if one of the grouped devices is in a state in which it is incapable of printing on double-sides (a malfunction of the double-side unit, paper set up on the feeder tray is heavy paper, OHP or the like) so as to make an error, this device can be treated as an exception.

Grouping Processing

Next, the grouping processing will be described in detail.

Figure 10:
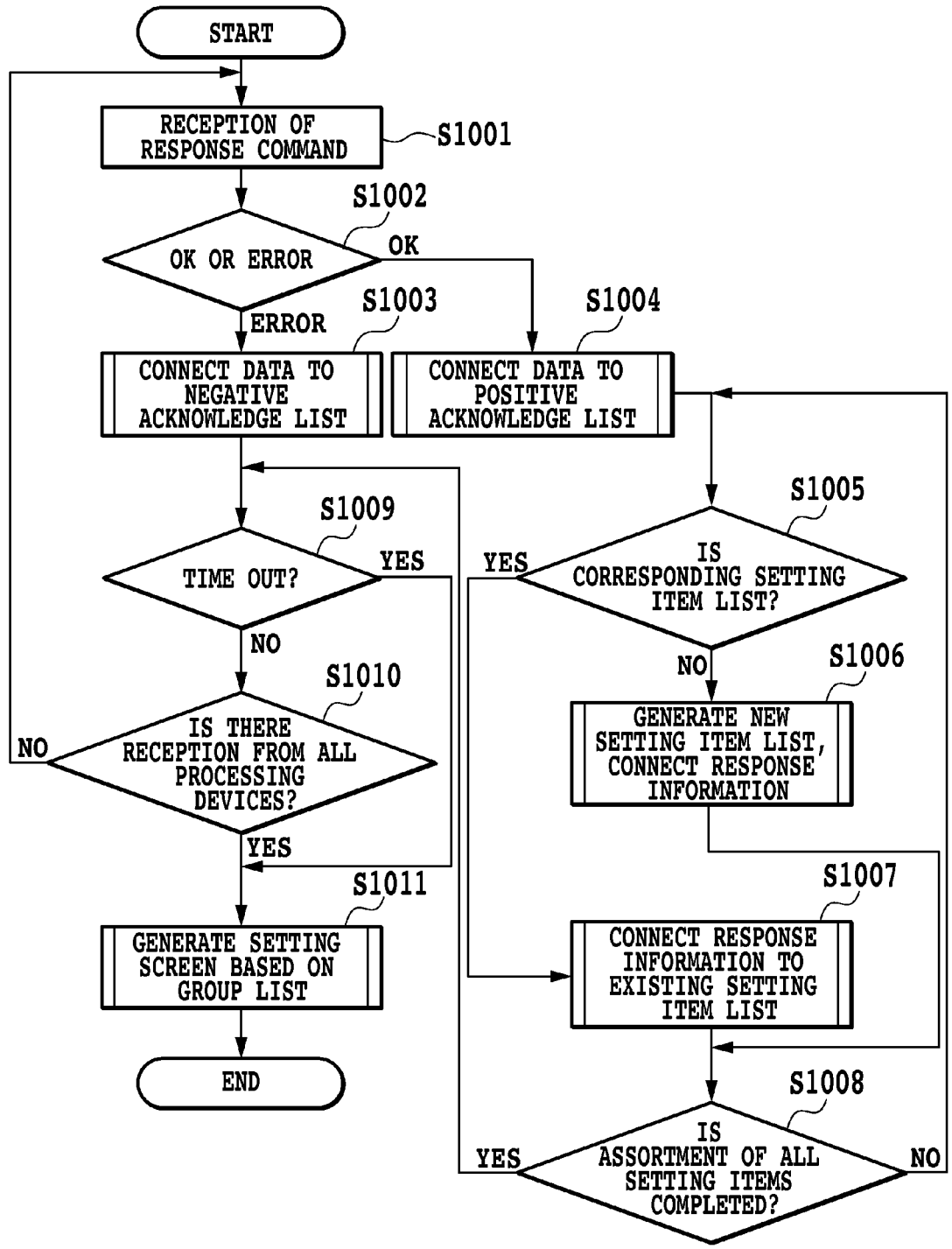
FIG. 10 is a flowchart showing the processing performed for grouping.
Figure 11B:
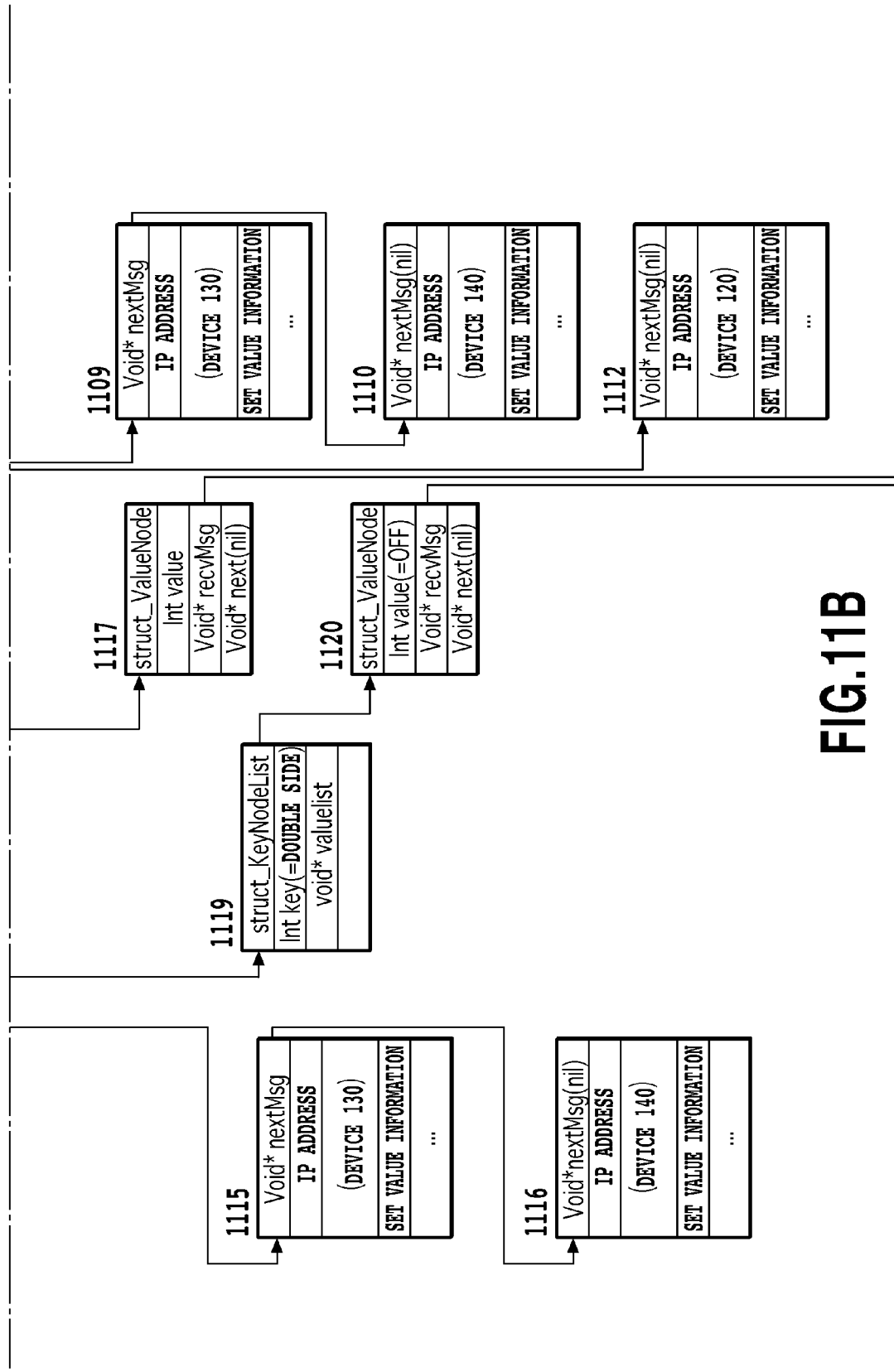
FIG. 11B is a diagram illustrating the group list structure.
Figure 11C:
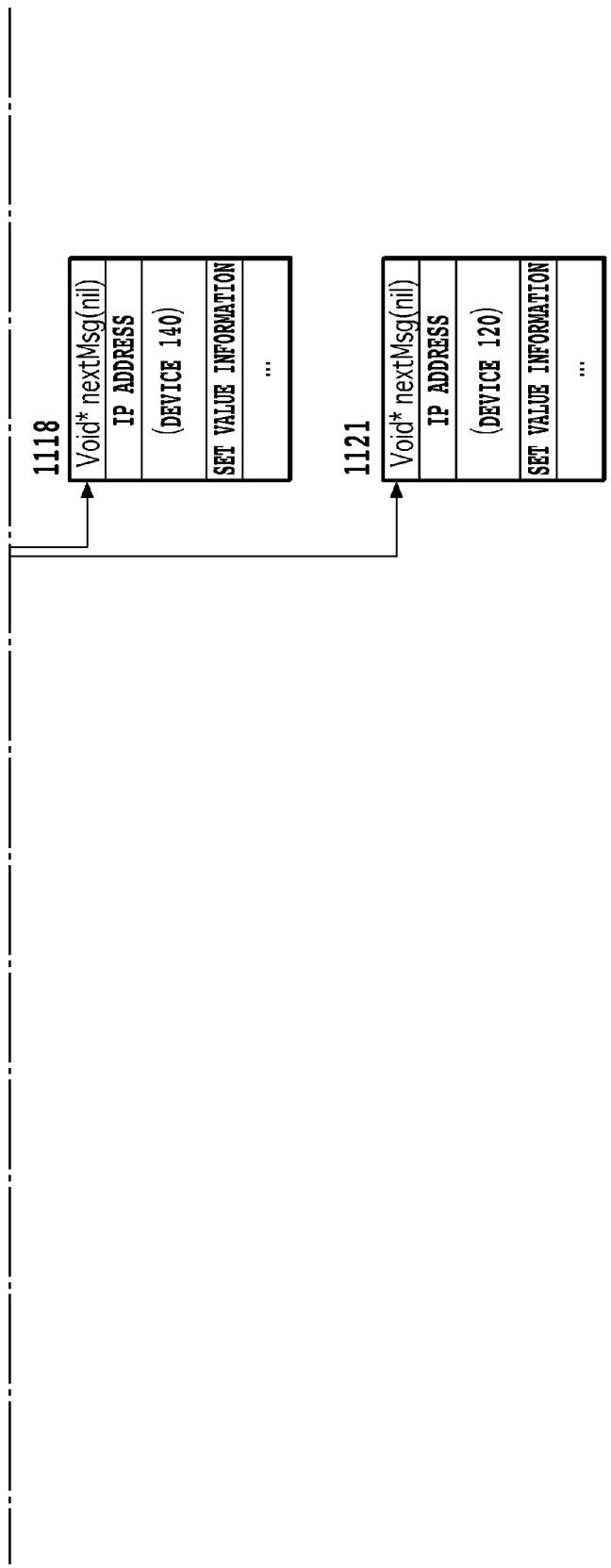
FIG. 11C is a diagram illustrating the group list structure.

FIG. 10 is a flowchart of the processing when the image processing device receiving the setting information response commands or the setting change response commands from the devices on the network performs grouping on these devices. The grouping is equivalent to the operation of creating a group list of a structure as shown in FIG. 11A to FIG. 11C. However, the outline from the reception of the response command to the generation of a setting display showing the grouped devices is first described. Then, the structure of the group list will be described.

Upon the reception of a response command at step S1001, the command analysis unit 1440 determines at step S1002 whether the contents of the received response command are OK or an error. This determination is made by referring to the information of the processing result 1303 included in the response command. If the error is determined, the process goes to step S1003 and if OK is determined, the process goes to step S1004.

At step S1003, the command analysis unit 1440 connects the data obtained from the received response command to the negative acknowledge list. After the connection of the data, the process goes to step S1009.

On the other hand, the command analysis unit 1440 at step S1004 connects the data obtained from the received response command to the positive acknowledge list. After the connection of the data, the process goes to step S1005.

In steps S1005 to S1007, the command analysis unit 1440 refers to a setting item sub ID in the response section 1310 of the response command, and then performs the assortment processing on a setting item-by-setting item basis.

At step S1005, the command analysis unit 1440 determines whether or not a setting item list of the same contents based on a response command received prior to the response command in question already exists. If the absence is determined, the process goes to step S1006. It should be noted that regarding the firstly received response command, it is determined that there is no setting item list of the same contents in the nature of things.

At step S1006, the command analysis unit 1440 creates a new setting item list, and connects the data obtained from the received response command to the list.

On the other hand, when there is a response command already received and it is determined at step S1005 that the setting item list of the same contents exists, the process goes to step S1007.

At step S1007, the command analysis unit 1440 connects the data obtained from the response command to the existing setting item list.

Next, at step S1008, the command analysis unit 1440 determines whether or not the assortment is completed, that is, the data corresponding to the number of setting items of the response command is connected to any of the setting item lists. If there is an unconnected data, the process goes back to step S1005. If it is determined that the data corresponding to all the setting items in the received response command is connected to any of the setting item list, the process goes to step S1009.

At step S1009, the command analysis 1490 determines whether or not a reception time-out occurs, that is, a preset and predetermined time has elapsed after the transmission of the setting information/setting change request command. If it is determined that the predetermined time has not elapsed and therefore the reception time-out does not occur, the process goes to step S1010. If it is determined that the predetermined time has elapsed and the reception time-out results, the process goes to step S1011.

At step S1010, the command analysis unit 1440 determines whether or not this image processing device receives the response commands from all the image processing devices to which the setting information/setting change request command is transmitted therefrom. If it is determined that the response command is not received from all the image processing devices, the process goes back to step S1001 to continue to perform the reception processing.

On the other hand, when it is determined that the response commands are received from all the image processing devices, the process goes to step S1011.

At step S1011, the setting screen generation unit 1430 generates the aforementioned setting screen based on the generated group list.

FIG. 11A to FIG. 11C is a diagram showing the structure of the group list generated by the command analysis unit 1440.

The group list 1101 comprises a whole size 1101a, the number of devices retuning positive acknowledge 1101b, positive-acknowledge list information 1101c, the number of devices retuning negative acknowledge 1101d, and negative-acknowledge list information 1101e.

A setting-item list 1102 is connected to the positive-acknowledge list information 1101c of the group list 1101. The setting item list 1102 includes an ID 1102a indicating setting items as key information, and a list 1102b of the set values obtained in response to the setting information request or the setting change request. In the example of FIG. 11A, the setting of the power-saving mode, the setting of the forced double-side mode, the setting of the forced layout mode and the setting of the forced toner-saving mode are included as key information.

A set-value list 1103 is connected to the setting-item list 1102, and comprises a set value 1103a, a received response-command list 1103b, and next-value list presence/absence 1103c. This example includes "−10%" of the set value of the power-saving mode, from which it is seen that there is the next set-value list of set values differing from the previous set values for the same power-saving mode.

Another set-value list 1104 has set values differing from those in the set-value list 1103 although the setting item is the same. That is, the set value of the power-saving mode is "−50%". The set-value list 1104 is connected to the response command list 1107.

A response command list 1105 is connected to the set-value list 1103, and includes information on an IP address for identifying the image processing device 120 and the like. The response command list 1105 is further connected to a response command list 1106 of the image processing device 140 having the same set values relating to the same setting item Approximately the same can be said of the setting of the forced double-side mode, the setting of the forced layout mode and the setting of the forced toner-saving mode. Specifically, for the setting of the forced double-side mode, the set-value list 1108 in which the set value indicates "ON" is connected, and the next set-value list 1111 in which the set value indicates "OFF" is connected to the set-value list 1108. To the set-value list 1108, the response command lists 1109 and 1110 are connected. To the set-value list 1111, the response command list 1112 is connected. For the setting of the forced layout mode, the set-value list 1113 is connected, and the response command lists 1114 to 1116 are connected to the set-value list 1113. S1114 to S1116 are connected to S1113. In addition, for the setting of the forced toner-saving mode, the response command list 1118 is connected to the set-value list 1117.

The setting item list 1119 is connected to the negative-acknowledge list information 1101a of the group list 1101, and then the set-value list 1120 is connected thereto. In turn, the response command list 1121 is connected to the set-value list 1120.

In this manner, a group list is generated on the basis of the received response commands, and the image processing devices on the network are grouped.

As described above, according to the present invention, the user can collectively configure the setting in each group of devices with overlapping setting contents among a plurality of network-connected devices having various configurations, leading to an increase in efficiency of setting operation. In addition, since information can be grouped in accordance with response states of the devices and setting contents and setting operation can be achieved while recognizing the grouped information on the screen, it makes reliable setting free from errors possible.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-007670, filed Jan. 16, 2009, which is hereby incorporated by reference herein in its entirety.

What is claimed is:

1. An application setting management apparatus connected to a plurality of devices through a communication line, said application setting management apparatus comprising:
- a reception unit configured to receive set information on certain setting items of an application from each of the plurality of devices through the communication line;
- a distinguishing unit configured to analyze the received information on the certain setting items of the application and distinguish devices that are identical to each other in information on the certain setting items;
- a group processing unit configured to group the devices distinguished as being identical to each other in information on the certain setting items, said application setting management apparatus not being one of the devices and not being in any group;
- a transmission unit configured to transmit information used for collectively assigning the same information to the certain setting items through the communication line to the devices grouped by said group processing unit;
- a user interface for receiving instructions from a user; and
- an information generation unit configured to generate the information used for collectively assigning the same information to the certain setting items,
- wherein said group processing unit comprises
  - a list generation unit configured to generate a list of the devices distinguished as being identical to each other in information on the certain setting items, and
  - a screen generation unit configured to generate a setting screen on said user interface for collectively assigning the same information to the certain setting items on the devices distinguished as being identical to each other in information on the certain setting items on the basis of the list,
- wherein said information generation unit generates the information used for collectively assigning the same information to the certain setting items on the basis of the instructions entered by the user through the setting screen, and
- wherein said screen generation unit arranges setting screens in a layered structure for each group of devices distinguished as being identical to each other in information on the certain setting items, with layers corresponding respectively to the devices in the group and overlapping one another.

2. The management apparatus according to claim 1, wherein said group processing unit breaks up the grouping in accordance with a selection of the user entered through said user interface.

3. The management apparatus according to claim 1, wherein said group processing unit registers a non-grouped device of the plurality of devices in a certain group in accordance with a selection of the user entered through said user interface.

4. The management apparatus according to claim 1, wherein
- said reception unit receives, through the communication line, updated information in regard to the certain setting items from each of the grouped devices after the information used for collectively setting the same information on the certain setting items is transmitted to the grouped devices by said transmission unit, and
- said group processing unit re-groups the plurality of devices on the basis of the received, updated information in regard to the certain setting items.

5. A method for controlling an application setting management apparatus which is connected to a plurality of devices through a communication line and has a user interface, said method comprising:
- a receiving step of receiving information on certain setting items of an application from each of the plurality of devices through the communication line;
- an analyzing step of analyzing the received information on the certain setting items of the application and distinguishing devices that are identical to each other in information on the certain setting items;
- a group processing step of grouping the plurality of devices distinguished as being identical to each other in information on the certain setting items, the application setting management apparatus not being one of the devices and not being in any group, the application setting management apparatus not being one of the devices and not being in any group;
- a transmitting step of transmitting information used for collectively assigning the same information to the certain setting items through the communication line to the devices grouped in said group processing step;
- an instruction receiving step of receiving instructions from a user through the user interface; and
- an information generating step of generating information used for collectively assigning the same information to the certain setting items,
- wherein said group processing step comprises:
  - a list generating step of generating a list of the devices distinguished as being identical to each other in information on the certain setting items, and
  - a screen generating step of generating a setting screen on the user interface for collectively assigning the same information to the certain setting items on the devices distinguished as being identical to each other in information on the certain setting items on the basis of the list,
- wherein said information generating step includes generating the information used for collectively setting the same information on the certain setting items on the basis of the instructions entered by the user through the setting screen, and
- wherein said screen generating step includes arranging setting screens in a layered structure for each group of devices distinguished as being identical to each other in information on the certain setting items, with layers corresponding respectively to the devices in the group and overlapping one another.

6. A non-transitory, computer-readable medium storing, in executable form, a program for causing a computer to perform a method for controlling an application setting management apparatus which is connected to a plurality of devices through a communication line and has a user interface, said method comprising:
- a receiving step of receiving information on certain setting items of an application from each of the plurality of devices through the communication line;
- an analyzing step of analyzing the received information on the certain setting items of the application and distinguishing devices identical to each other in information on the certain setting items;
- a group processing step of grouping the plurality of devices distinguished as being identical to each other in information on the certain setting terms, the application setting management apparatus not being one of the devices and not being in any group;

a transmitting step of transmitting information used for collectively assigning the same information to the certain setting items through the communication line to the devices grouped in the group processing step;

an instruction receiving step of receiving instructions from the user through the user interface; and an information generating step of generating information used for collectively assigning the same information to the certain setting items, wherein said group processing step comprises:
- a list generating step of generating a list of the devices distinguished as being identical to each other in information on the certain setting items, and
- a screen generating step of generating a setting screen on the user interface for collectively assigning the same information to the certain setting items on the devices distinguished as being identical to each other in information on the certain setting items on the basis of the list, wherein said information generating step includes generating the information used for collectively assigning the same information to the certain setting items on the basis of the instructions entered by the user through the setting screen, and wherein said screen generating step includes arranging setting screens in a layered structure for each group of devices distinguished as being identical to each other in information on the certain setting items, with layers corresponding respectively to the devices in the group and overlapping one another.

* * * * *